United States Patent [19]
Matsushima et al.

[11] Patent Number: 5,353,797
[45] Date of Patent: Oct. 11, 1994

[54] ULTRASONIC DIAGNOSTIC APPARATUS

[75] Inventors: Tetsuya Matsushima; Atsuo Iida; Keiichi Murakami; Takuya Noda, all of Kawasaki, Japan

[73] Assignee: Fujitsu Limited, Kawasaki, Japan

[21] Appl. No.: 88,057

[22] Filed: Jul. 8, 1993

[30] Foreign Application Priority Data

Jul. 15, 1992 [JP] Japan .................................. 4-187932
Jul. 15, 1992 [JP] Japan .................................. 4-187934

[51] Int. Cl.$^5$ ................................................ A61B 8/00
[52] U.S. Cl. ................................ 128/661.01; 73/626
[58] Field of Search ..................... 128/660.01, 660.07, 128/660.08, 661.01; 73/861.25, 626

[56] References Cited

U.S. PATENT DOCUMENTS

| | | | |
|---|---|---|---|
| 4,611,494 | 9/1986 | Uchiyama et al. | 128/661.01 |
| 5,092,337 | 3/1992 | Uchiumi et al. | 128/661.01 |
| 5,186,175 | 2/1993 | Hirama et al. | 128/661.01 |

*Primary Examiner*—George Manuel
*Attorney, Agent, or Firm*—Staas & Halsey

[57] ABSTRACT

An ultrasonic diagnostic apparatus including ultrasonic transducers. The ultrasonic diagnostic apparatus performs calculations for respective ultrasonic transducers to determine at which focal position a signal having just been received by the transducers is reflected in accordance with a lapse of time from a time when ultrasonic waves are transmitted. A delay time of respective received signals obtained from the transducers are determined in accordance with the results of the calculations. According to the present invention, control data which determines the delay time is stored in a first stored apparatus, compensation data which compensates the control data is stored in a second storage apparatus. The control data and compensation data read out respectively from these first and second storage apparatuses are added to one another, and the delay time for transmission and reception is determined according to the sum of the control data and compensation data.

15 Claims, 21 Drawing Sheets

ULTRASONIC DIAGNOSTIC APPARATUS

BACKGROUND OF THE INVENTION

1. Field of the Invention

The present invention relates to an ultrasonic diagnostic apparatus which is provided with an ultrasonic probe comprising a number of ultrasonic transducers arranged in a specified direction to obtain internal tomographic images of a subject by transmitting and receiving ultrasonic waves from this ultrasonic probe and, more particularly, to an ultrasonic diagnostic apparatus with an improved delay control.

2. Description of the Related Art

An ultrasonic diagnostic apparatus has been used which is capable of facilitating diagnosis of an internal disease of a human body by transmitting ultrasonic waves into a subject, particularly a human body, receiving echo ultrasonic waves reflected from the tissues of the human body by an ultrasonic probe having a number of ultrasonic transducers and displaying an image of an affected part of the human body based on these received ultrasonic waves.

FIG. 16 is a block diagram showing a configuration example of a conventional ultrasonic diagnostic apparatus.

Control means 8 reads out transmission delay control data from transmission delay amount storage means 4 and sets the transmission delay control data in all channels of transmission delay means 3. Then the control means 8 transmits a transmission start signal to the transmission delay means 3. The transmission delay means 3 receives this transmission start signal and generates a transmission pulse at a time based on the preset transmission delay control data. This transmission pulse is converted to a high voltage pulse by a transmission driver 2 and individual transducers 1 are driven with this high voltage pulse.

FIG. 17 is a graphic diagram showing a relationship between arranged ultrasonic transducers and focal positions in a subject.

For example, in case of a linear scan type, a scanning line normal to the direction of the array of transducers is formed as shown in FIG. 17, by ultrasonic waves transmitted from respective transducers 1 shown in FIG. 16. For transmitting ultrasonic waves into a subject so that a focus may be formed at point A shown in FIG. 17, a difference between path OA and path RA (SA) is as shown below, taking into account the timings of transmission pulses corresponding to point R (transducer 1_1) and point S (transducer 1_128).

$$\overline{RA} - \overline{OA} = \sqrt{H^2 + k^2} - k \quad (1)$$

Assuming a delay time defined by transmission delay means 3 corresponding to the transducer nearby point O as D and the velocity of sound as V, a delay time K defined by the transmission delay means 3 corresponding to points R and S is as given below.

$$D - [\sqrt{H^2 + k^2} - k]/V \quad (2)$$

Ultrasonic waves to be transmitted through each of other transducers can similarly be delayed as long as a time given by the above expression from distance H from point O to the transducer. This is the same with focuses B and C.

FIG. 18 is graphic diagram showing a relationship between transducers 1 and respective delay times.

For transmitting ultrasonic waves so that the focus is positioned respectively at focal points A, B or C shown in FIG. 17, ultrasonic waves are transmitted from each transducer 1 while being delayed for a specified delay time along the curve of focus A, B or C shown in FIG. 18.

Description is continued back to FIG. 16.

Ultrasonic waves reflected from a boundary of tissues in the subject are received again by the ultrasonic transducers 1 and converted to electric signals. The signals received and converted to electric signals are amplified to a specified degree of amplification by a preamplifier 5 and entered into reception delaying/adding means 9. Reception delaying/adding means 9 delays the received signals entered from individual channels as long as specified and adds the received signals from all channels to obtain scanning signals. In the example shown in FIG. 16, reception delay means 10 corresponding to respective channels are provided and control means 8 reads out received delay-controlled data stored in the received delay amount storage means 7 and sets the received delay-controlled data in all reception delay means 10. Reception delay means 10 delays the received signals to be entered as long as a time based on given received delay-controlled data. For example, such representative reception delay means is known as for varying the delay time by selectively connecting input and output taps by a switch through an electromagnetic delay line having a plurality of input and output taps or for converting received signals to digital signals by the A/D converter and delaying the timing by using the shift register or a memory such as an SRAM and a DRAM.

Assuming a distance from the center of scanning to each transducer as H and a focal distance as k, a delay time given to each channel in case of a linear scan type is given as shown below as in case transmission:

$$K = D - [\sqrt{H^2 + k^2} - k]/V \quad (3)$$

If the focus for reception is set at only the same focus as for transmission, the resolution is satisfactory only in an area near the focus and unsatisfactory in other areas where ultrasonic waves are dispersed. Therefore, a method referred to as "dynamic focus" by which the focal point set for reception is shifted to a farther distant point in sequence in accordance with penetration of ultrasonic waves, that is, the time which has passed after transmission is adapted to obtain a uniform resolution regardless of the penetration of ultrasonic waves. For example, focuses A, B and C shown in FIG. 6 are set with interval d and the focus is shifted by changing the setting to focus B with lapse of time 2d/V after ultrasonic waves reflected at focus A have reached point O and further to focus C with lapse of time 2d/v.

All received signals which are thus time-adjusted in accordance with the time of arrival are added by adding means 11 and a scanning signal thus obtained is sent to the displaying means (not shown) and a tomographic image of an internal part of the subject is displayed.

Along with diffusion of ultrasonic diagnostic apparatuses in recent years, a demand for higher resolution has been intensified and it has been necessary to implement a larger scanning aperture by increasing the number of transducers 1.

The following discusses a consideration for further improvement of resolution by carrying out the dynamic focus setting in the above described conventional example. Generally, improvement of the resolution in the focal area can be achieved by enlarging the scanning aperture or increasing the number of elements. In this case, the difference of path between the ultrasonic waves received at the central point O of scanning (refer to FIG. 17) and those received at end points R and S is large. Accordingly, the delay time D of received signals obtained by the transducers around the center of scanning in the case shown in FIG. 7 should be larger. Though the resolution at the focus is further improved if the the scanning aperture is made large, dispersion of ultrasonic waves at a position away from the focus is larger than that in case of the smaller scanning aperture and, in turn, the resolution deteriorates. Therefore, the distance d between focuses (refer to FIG. 17) need be small and the number of focuses to be set by the dynamic focus setting method need be increased.

As a result of extending the delay time D and reducing the distance d between focuses, in other words, in case of $D<2d/V$, a problem will occur in the conventional dynamic focus setting method.

The following discusses a case where $D>2d/V$ is satisfied. When, for example, an ultrasonic wave reflected from the focus A shown in FIG. 6 is received at point O, the reflected ultrasonic wave which is then sent toward point R stays at point P. The signal received at point O is delayed only as long as a delay time D (refer to FIG. 18) and must finally be added at the same time as the signals of reflected ultrasonic waves from the focus A which are received by all transducers 1. Because of $D>2d/V$, however, the delay time of each received signal in reception delay means 10 (refer to FIG. 16) is changed to a delay time (refer to FIG. 18) corresponding to the focus B before the ultrasonic wave reflected from the focus A is received by transducers 1_1 and 1_128 at both ends. The signal of ultrasonic wave reflected from the focus A which is received by transducers 1_1 and 1_128 arranged at, for example, points R and S is delayed as long as a delay time corresponding to the focus B and accordingly a correct focus is not formed to result in a cause of deterioration of the resolution contrary to improvement. The conventional method is therefore restricted by $D<2d/V$ and the improvement of resolution is also limited.

Another problem related to the delay is an unevenness of the velocity of sound in a subject.

For the purpose of comparison, an ultrasonic diagnostic apparatus which is not provided with a feature for compensating wavefront deviation of ultrasonic waves is first described and an ultrasonic diagnostic apparatus provided with the feature for compensating the wavefront deviation is next described.

FIG. 19 is a block diagram of a conventional typical ultrasonic diagnostic apparatus which has been known from the Patent Application Disclosure No. 28989-1978.

Transmission storage means 113 shown in FIG. 19 stores, for example, the transmission delay time data for ultrasonic transducers corresponding to the focal positions shown in FIG. 18. Control means 108 reads out the transmission delay data corresponding to the specified focal positions stored in the transmission storage means 113 and sets them in a group of transmission delay circuits 117. Driving pulses are outputted from the transmission delay circuit group 117 in accordance with the transmission delay data, which have been set at respective timings in response to the differences in the times necessary for the ultrasonic waves transmitted from corresponding transducers 1_1, 1_2, ..., 1_128 to reach the specified focal positions. These driving pulses are converted to high voltage pulses by a group of transmission circuits 102 and drive corresponding transducers 1_1, 1_2, ..., 1_128 of a group of transducers 1, thereby ultrasonic waves are generated toward the inside of the subject (not shown). Ultrasonic waves transmitted these transducers 1_1, 1_2, ..., 1_128 are synthesized to form an ultrasonic beam which is to be focused on the specified focal position in the subject and this ultrasonic beam is transmitted into the subject.

Ultrasonic waves transmitted into the subject are reflected from the boundary of tissues or the like in the subject and received again by transducers 1_1, 1_2, ..., 1_128 which form the group of transducers 1. These received signals are respectively amplified by preamplifiers which form the group of preamplifiers 103 and entered into the delaying/adding means 7. In this case, the reception storage means 109 stores reception delay data, as shown in FIG. 18 as in case of transmission, corresponding to the focuses shown in FIG. 17 and the reception delay data corresponding to the specified focuses are read out by the control means 108 from the reception storage means 109. Received signals entered into this delaying/adding means 107 are respectively delayed in accordance with reception delay data by the delay line 106 so that the specified focuses are formed in the subject, and added to one another by the adder 120. Only received signals from positions around the focus are emphasized and received signals from other positions are suppressed. Received signals which are outputted from this adder 120 and added to one another are transmitted to the display unit, not shown, and the display unit displays a tomographic image of an inner part of the subject in accordance with these added received signals.

In this case, if the velocity of sound in the subject is uniform, a focus is formed in accordance with a delay time calculated in FIG. 18. However, an actual human body comprises various different systems and substances such as fat, muscles, liver and so forth and it is known that the velocity of sound in fat is 1480 m/sec. substantially smaller than that in other systems and substances such as muscles and a liver as 1570 m/sec.

In other words, there is a problem that, if the delay time is set with the velocity of sound as fixed, the wavefronts of ultrasonic waves transmitted into a human body by the transducers or ultrasonic waves which are reflected to reach the transducers are deviated and are not aligned to result in deterioration of the resolution. In addition, the thickness of the fat layer differs with individual subjects, for example, male and female human bodies and therefore the velocity of sound cannot be involved in advance as a constant factor in calculation.

An idea for forming an ideal focus by detecting and compensating this wavefront deviation has already been proposed in U.S. Pat. No. 4,817,614.

FIG. 20 is a basic configuration of an ultrasonic diagnostic apparatus provided with the feature for compensating the above described wavefront deviation. To avoid an overlapped description, the following sets forth only the points differing from the ultrasonic diagnostic apparatus shown in FIG. 19.

When transducers 1_1, 1_2, ..., 1_128 are driven by the group of transmission circuits 102, ultrasonic waves are transmitted from these transducers 1_1, 1_2, ..., 1_128 into a subject. Transmitted ultrasonic waves are reflected from a focal position in the subject while the wavefronts of ultrasonic waves are deviated from one another due to a fat layer near the surface of the subject body. These received signals are respectively amplified by the group of preamplifiers 103, then delayed by the delay line 106 under assumption that, for example, the velocity of sound is fixed, and entered into the time lag detector 121 after sampling with a specified interval of time and A/D conversion. The time lag detector 121 calculates a correlative function of two received signals obtained by adjacent transducers and a time lag, that is, a wavefront deviation of two received signals is obtained from the maximal value of correlative function. An algorithm for detecting this time lag is not the main theme of the present invention and is described in detail in a known example U.S. Pat. No. 4,817,614 and therefore it is omitted from this description.

Though it is described that received signals are entered into the time lag detector 121 after they have been converted to digital signals, a time lag detector capable of carrying out correlative calculation of received signals as are provided. In this case, received signals are respectively sampled by the sample hold circuit, accumulated in the analog memory, and entered into the time lag detector.

When a time lag is thus detected by the time lag detector 121, transmission delay time data and reception delay time data stored respectively in the transmission storing means 113 and the reception storing means 109 are rewritten so that proper focuses are formed by compensating the time lag. Therefore, in transmission and reception of following ultrasonic waves, the delay time in transmission and reception is compensated and a finely adjusted focus is formed despite of unevenness of the velocity of sound.

In a configuration shown in FIG. 20, the memories (transmission storage means 113 and reception storage means 109) for storing delay time data for forming the focus which has been calculated with the uniformity of the velocity of sound are used as the memories for storing delay time data after compensation and therefore it is advantageous in that new memories need not be additionally provided for compensation. In this configuration, however, the contents of the RAM need be rewritten, in turn, for all focuses. Approximately 16 focuses are set for transmission and approximately 64 focuses are set for reception and all data for 128 transducers, that is, a great deal of data need be rewritten for all focuses and therefore electric noise often occurs and it is impossible to rewrite the data during reception of ultrasonic waves. Accordingly, the data need be rewritten by suspending transmission and reception and therefore the frame rate falls down as much as such suspension to result in a problem in use.

Another conventional example and the points to be noted are described below.

FIG. 21 is a basic configuration of another conventional ultrasonic diagnostic apparatus. This conventional example is configured to control the phases of signals in reception. FIG. 22 shows an example of a time waveform of received signal. Differences from the ultrasonic diagnostic apparatus shown in FIGS. 19 and 20 are described below.

A typical time waveform of each received signal is as shown in FIG. 22. This waveform has a convexed envelope with a natural frequency of the transducer as a carrier. For example, assuming that a received signal shown with a solid line and a received signal shown with a broken line which is deviated by approximately 100 n sec. from the former received signal are added to one another, the time lag in this case is approximately 100 n sec. and the distance of forward and backward travels of the sound wave during this time lag is approximately 0.08 mm, substantially smaller than the resolution 1 mm of general ultrasonic diagnostic apparatuses. Generally, it is thought that the time lag as long as approximately ±1 cycle of the carrier hardly affects the resolution. However, if there is a phase difference in respective received signals, not only a mere time lag but also such phase difference should be compensated. If the frequency of the carrier is assumed to be 3.5 MHz, the phase of received signal deviates by $\frac{3}{8}$ cycles during 100 n sec., and therefore the suppression of these received signals when they are added is large and the signals will have a smaller level after addition. Therefore, to further improve the effect of addition, the phase need be aligned by delaying more finely than approximately ±1 cycle. If such phase alignment is performed only by the delay line, the tap pitch on the delay line should be extremely fine and the costs of the delay lines, costs and scale of selector switches and control amount will increase. As seen from the Patent Application Disclosure No. 96286-1979, a group of phase shifters 104 (refer to FIG. 21) are connected to the signal lines of transducers 1_1, 1_2, ..., 1-128 and the outputs of these phase shifters are selectively connected to the taps of the delay line through selector switches 105. Based on this configuration, the above described fine phase alignment can be carried out by the group of phase shifters 104 and the time lag can be roughly adjusted by the delay line 106 which can be formed in an appropriate scale.

In case of reception for which, for example, the focuses are respectively set at focal points a1, a2, ..., a5, b0, b1, ..., c5 as shown in FIG. 23, the input taps of the delay line 106 are selected for focuses a1~a5 located in the area of zone A by controlling the selector switches 105 to match the difference of delay time of point a3 and the positions of these taps are finely adjusted by phase shifters 104 to meet the focuses, respectively. Similarly, the input taps of the delay line 106 are selected by controlling the selector switches 105 to meet the difference of delay time at point b3 for setting the focuses to points b0~b5 in the area of zone B and that at point c3 for setting the focuses to points c0~c5 in the area of zone C, and the tap of these positions are finely adjusted by phase shifters 104 to meet the focuses, respectively.

An electromagnetic delay line is widely used as the delay line. Such delay line does not always ensure an ideal delay line and may include an error. When an ultrasonic beam is to be deflected as in sector scanning or increasing the scanning aperture to obtain a high resolution, a delay time through the delay line often increases to reach a duration of more than 10 μsec., maximum. In this case, even though a difference of delay time from each input tap to an output is 1%, the time lag of received signals will be finally more than 100 μsec. and the phase will be largely deviated. In the conventional example, therefore, the delay time obtained from each input tap to an output of the delay line mounted on the apparatus has been measured, phase control data has been prepared based on the measured data and the data obtained has been stored in the reception storage means 109. The actual apparatus usually has approximately eight zones and accordingly the taps of the delay line are selected in eight different ways. However, there are 64 or more focal points which can be set and therefore the phase control data of 64 focal points need be corrected for each of eight zones. These data are not hardware-compatible because the delay line differ with the type of apparatus. In other words, it is necessary for each apparatus to correct all phase control data and store it in storage means, thus imposing a substantial load on manufacturers.

As described above, there have been many problems with respect to storage and reentry of transmission delay time data and reception delay time data.

SUMMARY OF THE INVENTION

An object of the present invention made in view of the above described problems in the prior art is to provide an ultrasonic diagnostic apparatus capable of permitting to form aperture is expanded quickly and easily absorbing unevenness of the velocity of sound and a time lag due to the delay line and the like, thus ensuring a higher resolution of tomographic images to be displayed.

An ultrasonic diagnostic apparatus in accordance with the present invention intended to attain the above described object comprises an ultrasonic probe comprising a number of transducers which are arrayed in a specified direction to transmit ultrasonic waves into a subject and receive the ultrasonic waves reflected from the subject to obtain required received signals, delaying/adding means with variations of a delay time for delaying respective received signals so that a focus which is shifted in sequence in the subject is formed and adding the received signals one another, delay time control means for controlling a delay time of each received signal in the delaying/adding means, and display means for displaying tomographic images of internal parts of the subject in accordance with the received signals which are outputted from the delaying/adding means and added to one another, the apparatus being characterized in that the delay time control means controls the delaying/adding means so that all received signals are adaptively delayed as long as specified respectively for a number of ultrasonic transducers in accordance with the focal positions which are shifted in sequence, arrangement positions of a number of ultrasonic transducers, and lapse of time from the timing when ultrasonic waves are transmitted from the ultrasonic probe.

In case of a linear scanning type ultrasonic diagnostic apparatus which is provided with a linear scanning type ultrasonic probe comprising a number of ultrasonic transducers, which are linearly arrayed, as the above described ultrasonic probe and carries out 2-dimensional scanning by forming a scanning line normal to the array direction of a number of ultrasonic transducers and shifting the scanning line in sequence in the above described array direction to obtain a rectangular tomographic image of an internal part of a subject, the above described delay time control means is adapted to control the delaying/adding means so that the received signals are delayed according to an expression given below when the distance between the scanning line and each ultrasonic transducer is H, a lapse of time from the timing of transmission of ultrasonic waves is t, the velocity of sound in the subject is V, each delay time is K and a specified constant for avoiding an negative value of the delay time is D.

$$K = D - H^2/(V^2 t) \qquad (4)$$

In this linear scanning type ultrasonic diagnostic apparatus, the above delay time control means is preferably adapted to control the delaying/adding means in accordance with each delay time K which is integer-valued by quantizing it in terms of unit time and can be adapted to control the delaying/adding means in accordance with each delay time K obtained by using D, H/V and t which are integer-valued by quantizing these values in terms of unit time. The delaying/adding means can be controlled by using an expression obtained by appropriately transforming the expression (4).

In case of a convex sector scanning type ultrasonic diagnostic apparatus which is provided with a convexed sector scanning type ultrasonic probe comprising a number of ultrasonic transducers, which are arrayed in a shape of circular arc, as the above described ultrasonic probe and carries out 2-dimensional scanning by forming a scanning line normal to a tangential line of the array direction of a number of ultrasonic transducers and shifting the scanning line in sequence in the above described array direction to obtain a sector-shaped tomographic image of an internal part of a subject, the above described delay time control means is adapted to control the delaying/adding means so that the received signals are delayed according to an expression given below when a radius of circular arc along which a number of transducers are arrayed is R, an angle formed by the scanning line and a line connecting the center of the circular arc and ultrasonic transducers is $\theta$, a lapse of time of from the timing of transmission of ultrasonic waves is t, the velocity of sound in the subject is V, each delay time is K and a specified constant for avoiding an negative value of the delay time is D.

$$K = D - \{(R/V)(1-\cos\theta)(t+2R/V)\}/\{(R/V)(1-\cos\theta)+t\} \qquad (5)$$

In this convex sector scanning type ultrasonic diagnostic apparatus as in the above linear scanning type ultrasonic diagnostic apparatus, the above delay time control means is preferably adapted to control the delaying/adding means in accordance with each delay time K which is integer-valued by quantizing it in terms of unit time or adapted to control the delaying/adding means in accordance with each delay time K obtained by using D, R/V, R/V(1−cos $\theta$) and t which are integer-valued by quantizing these values in terms of unit time. The delaying/adding means can be controlled by using an expression obtained by appropriately transforming the expression (4).

In case of a phased array sector scanning type ultrasonic diagnostic apparatus which is provided with a linear type ultrasonic probe comprising a number of ultrasonic transducers, which are linearly arrayed, as the above described ultrasonic probe and carries out 2-dimensional scanning by forming a scanning line, which extends in a plane passing through specified points on an array of a number of ultrasonic transducers and including the array direction of a number of ultrasonic transducers and in a direction forming a specified angle in conjunction with a line normal to the above described array direction and shifting the scanning line in sequence in a direction where the above described specified angle is changed in sequence to obtain a sector-shaped tomographic image of an internal part of a subject, the above described delay time control means is adapted to control the delaying/adding means so that the received signals are delayed according to an expression given below where a distance between the specified point and each ultrasonic transducer is H, the above described specified angle is $\theta$, a lapse of time from the timing of transmission of ultrasonic waves is t, the velocity of sound in the subject is V, each delay time is K and a specified constant for avoiding an negative value of the delay time is D.

$$K=D-\{(H \sin \theta/V)(-t+H/(V \sin \theta))\}/\{t-H \sin \theta/V\} \quad (6)$$

In this phased array sector scanning type ultrasonic diagnostic apparatus, the above delay time control means is preferably adapted to control the delaying/adding means in accordance with each delay time K which is integer-valued by quantizing it in terms of unit time or adapted to control the delaying/adding means in accordance with each delay time K obtained by using D, H sin $\theta$/V, H/(V sin $\theta$) and t which are integer-valued by quantizing these values in terms of unit time. The delaying/adding means can be controlled by using an expression obtained by appropriately transforming the expression (4).

The above described problem has occurred in the conventional dynamic focus setting method since the focus for reception is shifted at a certain moment, for example, from focus A to focus B as shown in FIG. 17, that is, a curve of delay time in the reception delay means 10 (refer to FIG. 16) is changed over from a curve at focus A to a curve at focus B. On the contrary, the present invention with conversion of the idea is intended to know from which focal position a signal having been just received by a certain transducer is reflected (or to store the results of calculation) in accordance with the lapse of time from the timing of transmission of ultrasonic waves and determine the delay time of each received signal obtained by each transducer in accordance with the results of calculation.

More specifically, the present invention is adapted so that the delay amount for the received signals obtained from the transducers located near both ends, for example, transducers 1_1, and 1_128 is changed over to a delay time corresponding to the focus B after ultrasonic waves reflected from the focus A are received by transducers (transducers 1_1 and 1_128) even though the delay amount for the received signals obtained by the transducers, for example, transducers 1_64 and 1_65 located near the center O shown in FIG. 17 is changed over at a certain timing from a delay time corresponding to the focus A to a delay time corresponding to the focus B. Accordingly, an appropriately positioned focus is formed even under a condition where the above described inequality D>2d/V is satisfied and tomographic images with high resolution can be obtained.

In the ultrasonic diagnostic apparatus according to the present invention, the delay time for respective received signals obtained from the transducers is basically determined in accordance with the focal position which is shifted in sequence, array positions of a number of transducers and the lapse of time from the timing when ultrasonic waves are transmitted from the ultrasonic probe. Specifically, in cases of the linear scanning type ultrasonic diagnostic apparatus, convex sector scanning type ultrasonic diagnostic apparatus, and the phased array sector scanning type ultrasonic diagnostic apparatus, the delay time K of transducers is given by expressions (4), (5) or (6) given above.

In the delay time calculation in the conventional example, the square root as shown in the above expression (2) should be calculated using a lot of time and individual calculations are required for respective scanning lines, transducers and focuses and therefore the calculations need be finished in advance to a certain extent outside the apparatus for reasons as to calculation time and data volume and the data obtained from calculations need be stored, for example, in the ROM or the like provided in the transmission delay amount storage means 4 and the reception delay amount storage means 7. In this case, particularly, the reception delay amount storage means 7 has an extremely large capacity. There may be a necessity of rewriting the data for reasons such as alteration of or addition to the specifications of the probe. For these reasons, the method of the conventional example is substantially disadvantageous in those points of costs, dimensions of the apparatus, maintenance of the apparatus and others.

According to the present invention, the calculation of the square root is not required as known from the expressions (4), (5) and (6) shown above. In addition, the variable is only lapse of time t and other coefficients are the constants to be determined in accordance with the construction of the ultrasonic probe, scanning pattern and other factors and therefore real time high speed calculations are permitted, operating means capable of carrying out real time calculation of the reception delay amount can be provided instead of the reception delay amount storage means 7 (refer to FIG. 5). In this case, alteration of and addition to the specifications of the probe can easily be covered.

The following describes the derivation of expressions (4), (5) and (6).

Expression (4) in case of the linear scanning type ultrasonic diagnostic apparatus is described below.

FIG. 1 is an illustrative diagram for calculation of the delay amount in linear scanning.

The timing immediately after an ultrasonic wave has been transmitted from point O is assumed as time 0 and time t is set. It is assumed that an ultrasonic wave received at point A (or A') away as long as distance H from point O at a certain timing t is reflected from point F on the scanning line. If the length of segment FO of the focal distance is k, the following expression is given below:

$$\overline{FA} = \sqrt{h^2 + k^2}$$

A distance along which an ultrasonic wave advances until timing t is as shown below:

$$Vt = k + \overline{FA}$$

therefore, $$(Vt-k)^2 = \overline{FA}^2$$

$$V^2t^2 - 2Vtk + k^2 = h^2 + k^2$$

$$k = \frac{V^2t^2 - h^2}{2Vt}$$

Accordingly, the delay time K to be given at points A and A' is as given below.

$$\begin{aligned} K &= D - (\overline{FA} - k)/V \\ &= D - (Vt - 2k)/V \\ &= D - \frac{V^2t^2 - (V^2t^2 - h^2)}{V^2t} \\ &= D - \frac{h^2}{V^2t} \end{aligned} \quad (4)$$

Expression (5) in case of the convex sector scanning type ultrasonic diagnostic apparatus is described below.

FIG. 2 is an illustrative diagram for calculation of the delay amount in convex sector scanning.

In this case, R denotes the radius of the convex type probe and $\theta$ denotes an angle formed by the scanning line and a line connecting the center O of the radius and the transducer (point A). If the length of segment FP of the focal distance is k, the following is obtained:

$$\overline{FQ} = k + R(1 - \cos\theta)$$

$$\begin{aligned} \overline{FA} &= \sqrt{FQ^2 + R^2\sin^2\theta} \\ &= \sqrt{k^2 + 2kR(1 - \cos\theta) + R^2(1 - \cos\theta)^2 + R^2\sin^2\theta} \\ &= \sqrt{k^2 + 2(1 - \cos\theta)(kR + R^2)} \end{aligned}$$

From $Vt = k + \overline{FA}$ $$(Vt - k)^2 = \overline{FA}^2$$

$$V^2t^2 - 2Vtk + k^2 = k^2 + 2(1 - \cos\theta)(kR + R^2)$$

$$k = \frac{V^2t^2 + 2(1 - \cos\theta)R^2}{2\{R(1 - \cos\theta) + Vt\}}$$

Delay time K to be given at points A and A' is as follows:

$$\begin{aligned} K &= D - (\overline{FA} - k)/V \\ &= D - (Vt - 2k)/V \\ &= D - \frac{Vt\{R(1 - \cos\theta) + Vt\} - V^2t^2 + 2(1 - \cos\theta)R^2}{V\{R(1 - \cos\theta) + Vt\}} \\ &= D - \frac{R(1 - \cos\theta)(Vt + 2R)}{V\{R(1 - \cos\theta) + Vt\}} \\ &= D - \frac{R/V(1 - \cos\theta)(t + 2R/V)}{R/V(1 - \cos\theta) + t} \end{aligned} \quad (5)$$

In addition, an example case using the phased array sector ultrasonic diagnostic apparatus is described below. FIG. 3 is an illustrative diagram for calculation of the delay amount in phased array scanning. In this case, H denotes the distance from the center O of scanning to each transducer and $\theta$ denotes an angle formed by the direction of the normal line of the transducer array plane and the scanning line.

$$\begin{aligned} \overline{FA} &= \sqrt{k^2\cos^2\theta + (h - k\cdot\sin\theta)^2} \\ &= \sqrt{h^2 + h^2 - 2k\cdot h\cdot\sin\theta} \end{aligned}$$

From $Vt = k + \overline{FA}$ $$(Vt - k)^2 = \overline{FA}^2$$

$$V^2t^2 - 2Vtk + k^2 = k^2 + h^2 - 2k\cdot h\cdot\sin\theta$$

$$k = \frac{V^2t^2 - h^2}{2(Vt - h\cdot\sin\theta)}$$

Delay time K to be given at point A is as given below:

$$\begin{aligned} K &= D - (\overline{FA} - k)/V \\ &= D - (Vt - 2k)/V \\ &= D - \frac{Vt(Vt - h\cdot\sin\theta) - (V^2t^2 - h^2)}{Vt(Vt - h\cdot\sin\theta)} \\ &= D - \frac{-Vth\cdot\sin\theta + h^2}{V(Vt - h\cdot\sin\theta)} \\ &= D - \frac{h\cdot\sin\theta/V(-t + h/(V\sin\theta))}{t - h\cdot\sin\theta/V} \end{aligned} \quad (6)$$

A delay time to be given at point A' is obtained by substituting a distance from point O to point A' as "−H" in the expression (6) and can be directly calculated in the expression (6) by affixing a sign to "H" with the point A side as positive and the point A' side as negative.

For setting the delay time for each received signal obtained by each transducer in accordance with the result of calculation of delay time K using the above expressions (4), (5) and (6), it is more practical to quantize the delay time in terms of a unit time and convert it to an integral value in advance and make a circuit configuration to delay received signals as long as this integral value. Also for calculating the delay time by using expressions (4), (5) and (6), higher speed calculations are permitted by converting in advance the specified values in expressions (4), (5) and (6) to integral values and this is particularly preferable for the apparatus provided with operating means for calculating in real time the reception delay amount.

Though the above paragraphs describe respectively the linear scanning type ultrasonic diagnostic apparatus, convex sector scanning type ultrasonic diagnostic apparatus and the phased array sector scanning type ultrasonic diagnostic apparatus, an actual ultrasonic diagnostic apparatus can be, of course, constructed to be provided with plural types of ultrasonic probes and adapted for a plurality of scanning patterns.

The present invention which is made to implement the above described objects relates to second and third ultrasonic diagnostic apparatuses respectively comprising (1) a number of ultrasonic transducers arrayed in a specified direction to transmit ultrasonic waves into a subject and receive the ultrasonic waves reflected inside the subject to obtain received signals, (2) a transmission part for transmitting driving pulses to drive the ultrasonic transducers so that ultrasonic waves transmitted from the ultrasonic transducers are focused to a specified point inside the subject, (3) a delaying/adding part for delaying the received signals obtained respectively from the ultrasonic transducers and adding the received signals one another, and (4) a display part for displaying a tomographic image of an inner part of the subject in accordance with the received signals which are added one another and outputted by the delaying/adding part.

The second ultrasonic diagnostic apparatus according to the present invention has its characteristics at the reception side. In other words, the second ultrasonic diagnostic apparatus according to the present invention provided with (1)~(4) described above is further provided with (5) a first storage means for storing control data to determine a delay time for each received signal, (6) a second storage means for storing compensation data to compensate the control data, and (7) an adding means for adding control data read out from the first storage means and compensation data read out from the second storage means, and intended to control the delay time of respective received signals in accordance with the added data.

The second ultrasonic diagnostic apparatus according to the present invention may be adapted (8) to be provided with time lag detection means for detecting a time lag between received signals resulting from unevenness of a velocity of sound in a subject in accordance with received signals, (9) to store control data to determine the delay time of respective received signals in the first storage means in case that a specified velocity of sound is permitted in the subject, and

(10) to store compensation data for compensating a time lag between received signals, which is detected by the time lag detection means, in the second storage means.

An ultrasonic diagnostic apparatus according to the present invention provided with constituent features as described in (1)~(7) may be adapted so that

(11) the delaying/adding part is provided with phase adjusting means for adjusting a phase of each received signal and delay lines provided with a number of taps,

(12) control data for determining a delay time of each received signal in case that a difference of delay time through the delay lines is put aside consideration is stored in the first storage means, and

(13) compensation data for compensating a difference of delay time through the delay lines is stored in the second storage The second ultrasonic wave diagnostic apparatus provided with constituent features specified in (1)~(4) and (11)~(13) may be further provided with the features specified in (5)~(7). In other words, the ultrasonic wave diagnostic apparatus constructed as described above may be provided with

(14) time lag detection means for detecting a time lag between received signals resulting from unevenness of a velocity of sound in a subject in accordance with received signals, and

(15) third storage means for storing the second compensation data for compensating a time lag between received signals, which is detected by the time lag detection means, in addition to the constituent features specified in (1)~(4) and (11)~(13), the apparatus being characterized in that

(16) the above control data, compensation data and second compensation data are added.

According to the present invention, the transmission side of the apparatus may have a similar configuration. In other words, in the third ultrasonic diagnostic apparatus according to the present invention provided with the constituent features specified in (1)~(4), the transmission part defined in (2) above is provided with

(17) first storage means for storing control data which determines a transmission timing of each driving pulse,

(18) second storage means for storing compensation data which compensates the control data, and

(19) adding means for adding control data read out from the first storage means and compensation data read out from the second storage means and the apparatus is characterized to control the transmission timing of ultrasonic waves from respective ultrasonic transducers in accordance with added data.

Needless to say, the present invention allows to provide an ultrasonic diagnostic apparatus which has the characteristics both at the transmission side and at the reception side by combining the second ultrasonic diagnostic apparatus which has characteristics at the reception side and the third ultrasonic diagnostic apparatus which has characteristics at the transmission side.

The above described second and third ultrasonic diagnostic apparatuses according to the present invention are adapted to store control data for determining the delay time in the first storage means and compensation data for compensating the control data in the second storage means, add control data and compensation data read out from first and second storage means, respectively, and determine the delay time in transmission and reception in accordance with the data which has been added to one another.

In the above described second and third ultrasonic diagnostic apparatuses according to the present invention, ideal values in case that there is no time lag are stored in storage means as in case of the conventional example, that is, the first storage means specified in the present invention while a time lag due to unevenness of the velocity of sound in a human body or a difference of delay time from an input tap of the delay lines 6 to an output terminal is stored, for example, as a phase value at a carrier frequency of signal in second storage means which is additionally provided, and control data is obtained by adding those data read out both storage means. In this case, second storage means 5 can only store data as much as the number of scanning lines for compensating the unevenness of the velocity of sound in a human body and a compensation amount of the delay time for respective zones in case of compensating a difference of delay time through the delay line and therefore the second storage means with a far smaller capacity than the first storage means can be used. It is satisfactory to rewrite only compensation data stored in the second storage means and rewriting of all control data for the delay time which has been required is unnecessary.

As described above, the first ultrasonic diagnostic apparatus according to the present invention is adapted, for applying the dynamic focus setting method, to carry out calculation to check from which focal position a signal which has just been received by a transducer is reflected in accordance with a time having elapsed from the timing when a ultrasonic wave was transmitted (or to store the results of calculations) and determine the delay time of each received signal obtained through each transducer in accordance with the result of calculation and therefore this ultrasonic diagnostic apparatus is able to form an appropriately positioned focus and provide high resolution of images even when the scanning aperture is expanded. The second and third ultrasonic diagnostic apparatuses according to the present invention are adapted to store control data for determining the delay time in the first storage means and compensation data for compensating the control data in the second storage means, add control data and compensation data read out from the first and second storage means, respectively, and determine the delay time in transmission and reception in accordance with these added data and therefore these ultrasonic diagnostic apparatuses are able to easily absorb, at a high speed, a difference of delay time due to unevenness of the velocity of sound and a delay through the delay line.

DETAILED DESCRIPTION OF THE PREFERRED EMBODIMENTS

Embodiments of the present invention are described below.

Figure 1:
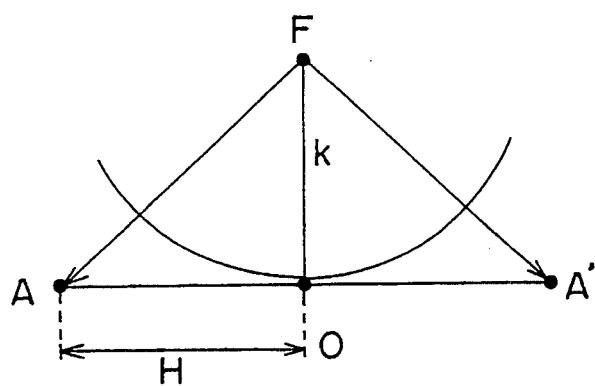
FIG. 1 is an illustrative diagram of calculation of delay time in linear scanning.
Figure 2:
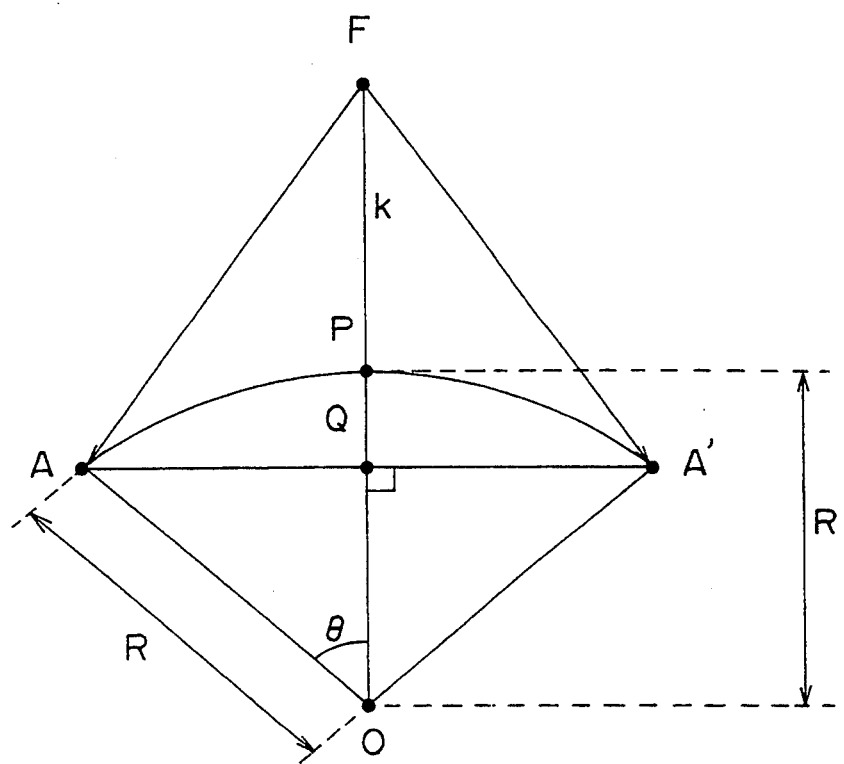
FIG. 2 is an illustrative diagram of calculation of delay time in convex sector scanning.
Figure 3:
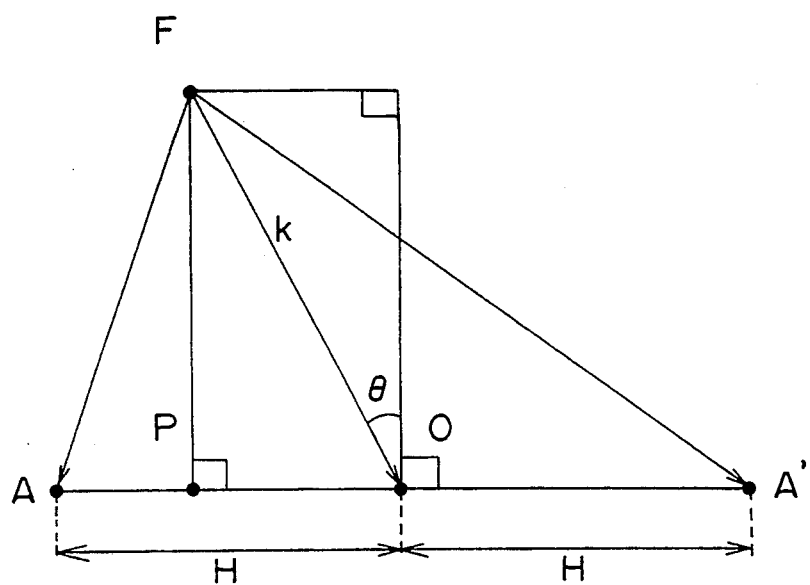
FIG. 3 is an illustrative diagram of calculation of delay time in phased array sector scanning.
Figure 4:
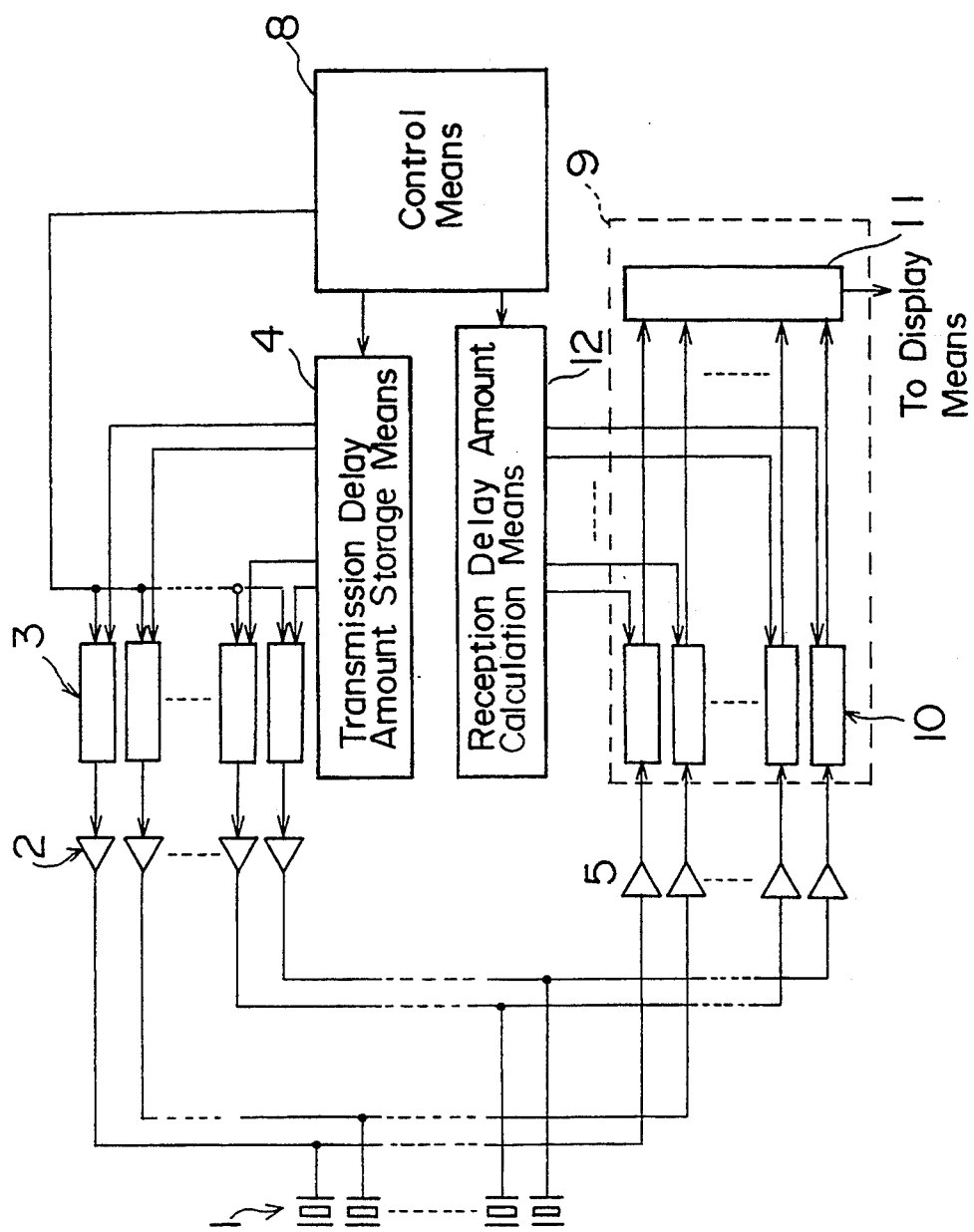
FIG. 4 is a block diagram showing the configuration of an ultrasonic diagnostic apparatus in accordance with an embodiment of the present invention.
Figure 16:
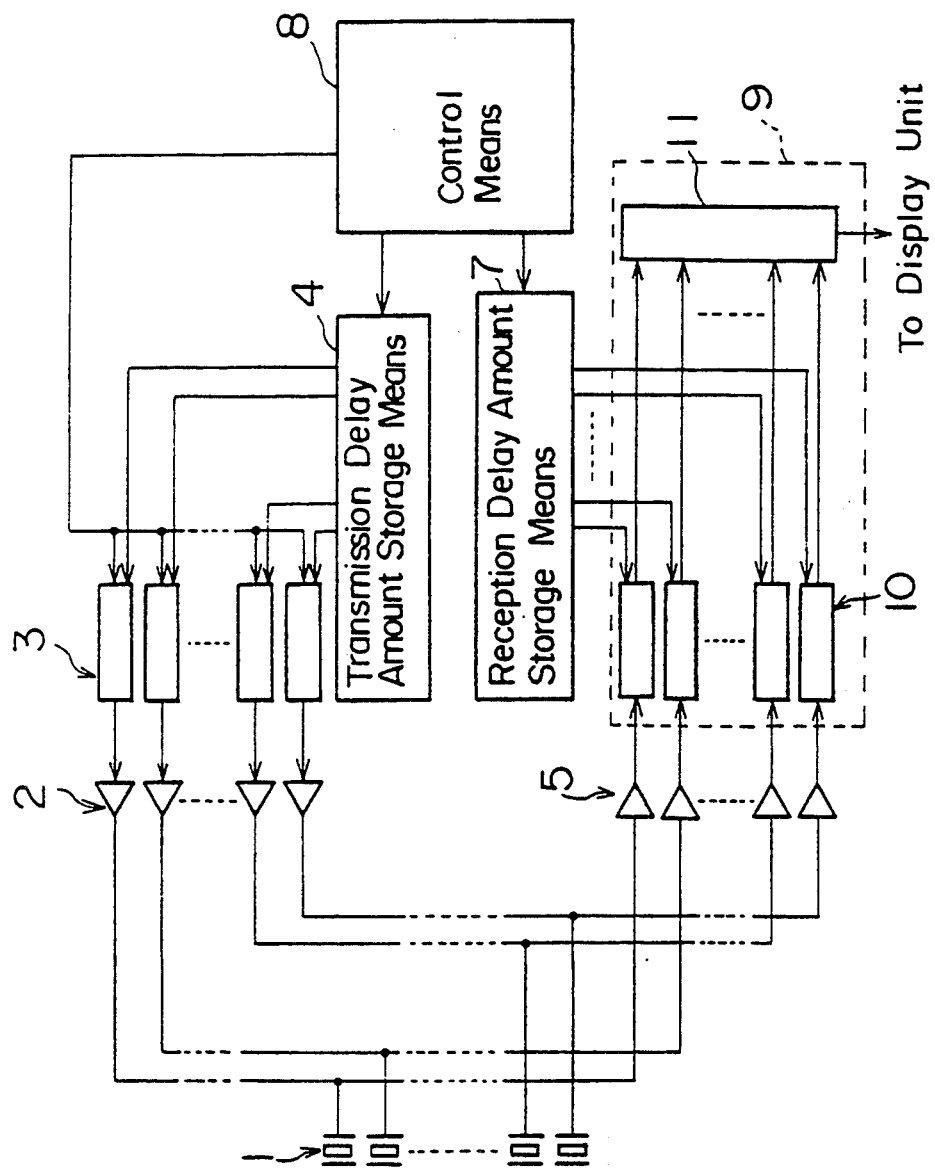
FIG. 16 is a block diagram showing a configuration example of the conventional ultrasonic diagnostic apparatus.
Figure 17:
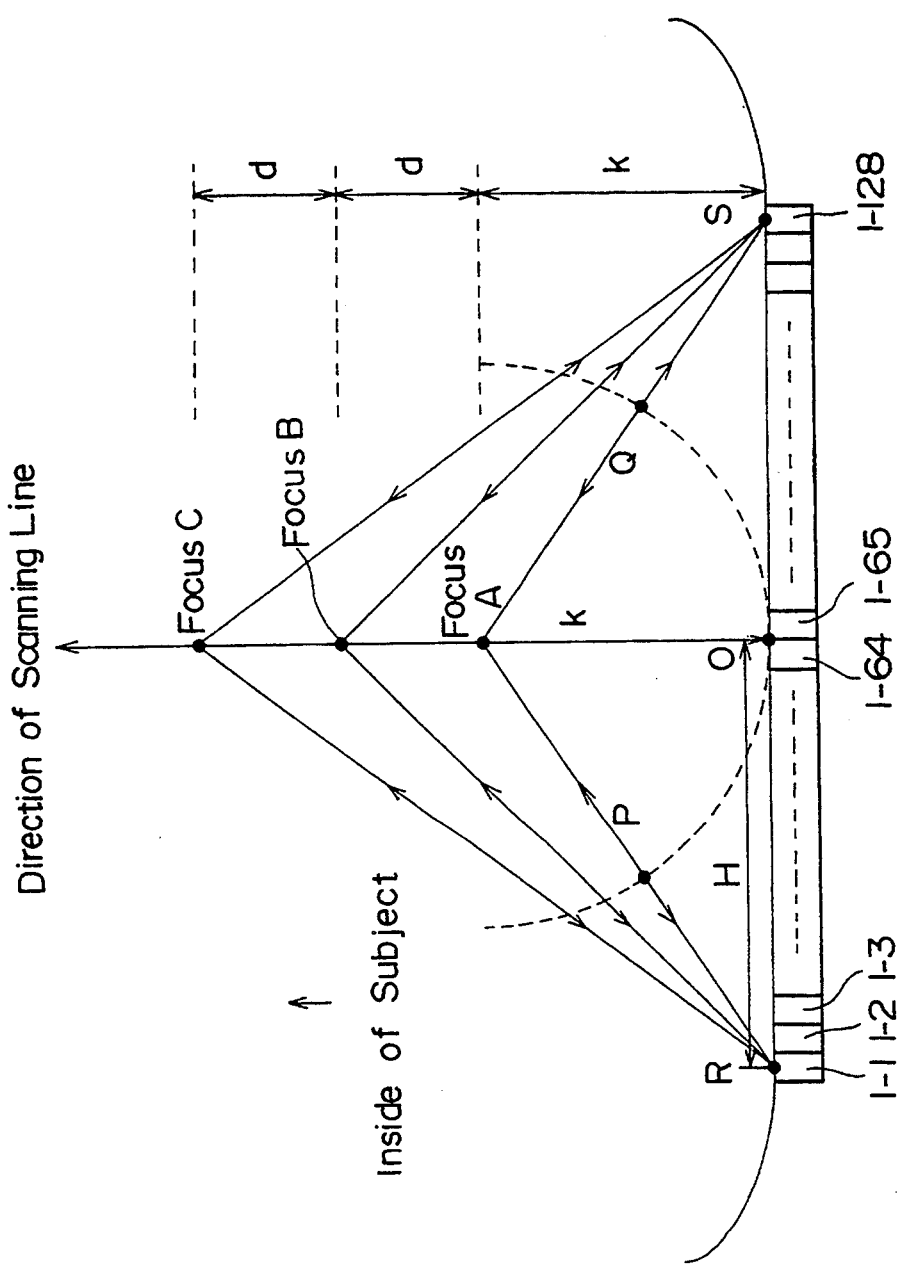
FIG. 17 is a graphic diagram showing a relationship between ultrasonic transducers which are arrayed and focal positions in a subject.

FIG. 4 is a configuration block diagram of an ultrasonic diagnostic apparatus in accordance with an embodiment of the present invention. To avoid duplication of description, the following description is limited to only the differences from the conventional example shown in FIG. 16.

In this embodiment, reception delay amount calculation means 12 is provided instead of reception delay amount storage means 7. This reception delay amount calculation means 12 carries out real time operation according to one of expressions (4), (5) and (6) in response to the type of the transducers and the type of scanning mode and sets reception delay control data based on the result of operation in reception delay means 10 so that received signals obtained from transducers 1 are adaptively delayed by the reception delay means 10.

The following describes the examples of reception delay amount calculation means in accordance with the types of transducers 1 and scanning mode.

Figure 5:
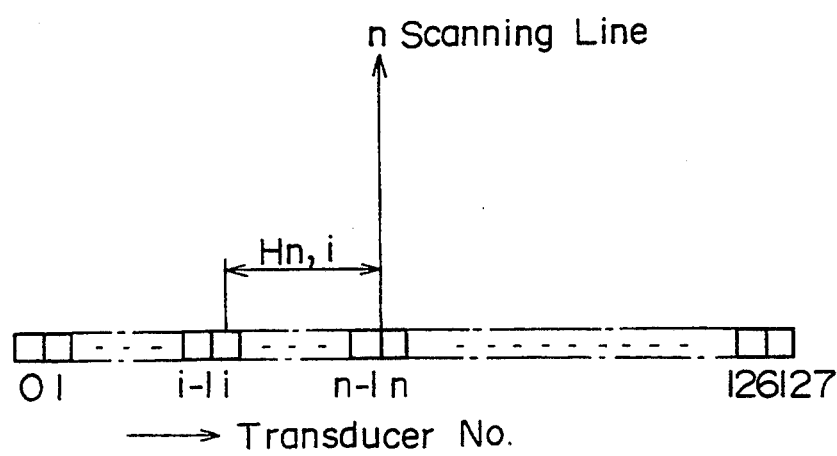
FIG. 5 is a diagram showing a relationship between scanning lines and transducers in linear scanning.
Figure 6:
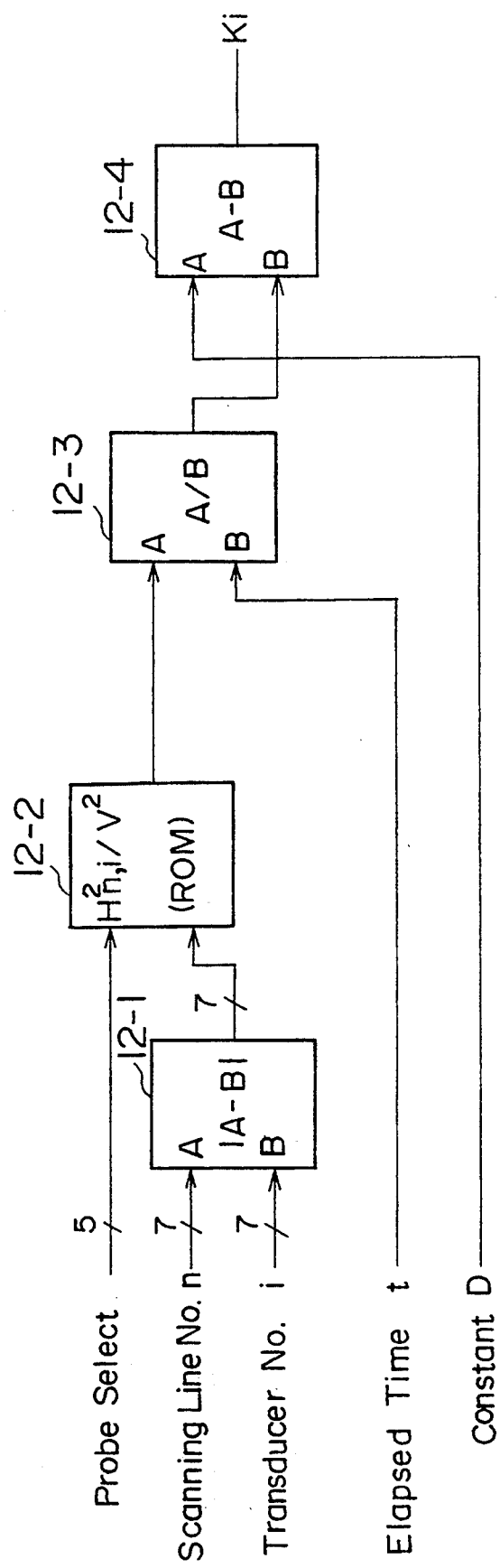
FIG. 6 is a block diagram showing reception delay amount calculating means in linear scanning.

FIG. 5 is a diagram showing a relationship between scanning lines and transducers in linear scanning and FIG. 6 is a configuration block diagram of the reception delay amount calculation means in linear scanning.

In this example, it is assumed that 128 transducers are arrayed with pitch P and given numbers 0, 1, ..., i−1, i, ..., n−1, n, ..., 128 in this order from the extreme left.

In this case, it is presumed that the scanning line n extends in the normal line passing through the center between the transducer n−1 and the transducer n as shown and ultrasonic waves reflected on this scanning line are received by the transducer i. In this case, a distance Hn,i between the scan n and the transducer i is as given below.

$$Hn,i = |(n-i-\tfrac{1}{2}) \cdot P| \quad (7)$$

Accordingly, when this distance Hn,i is substituted for H of expression (4) with respect to the transducers, delay time Kn, i of each transducer in each scanning line is obtained as shown below.

$$Kn,i = D - Hn,i^2/(V^2 t) \quad (8)$$

Expression (7) can be transformed as shown below:

$$Hn,i = P \cdot |n-i| - P/2 \quad (9)$$

Pitch P is a constant predetermined in accordance with the array of transducers and therefore the distance Hn,i is primarily determined according to an absolute value

|n−i| of the difference between the scanning line No.n and the transducer No.i.

Figure 8:
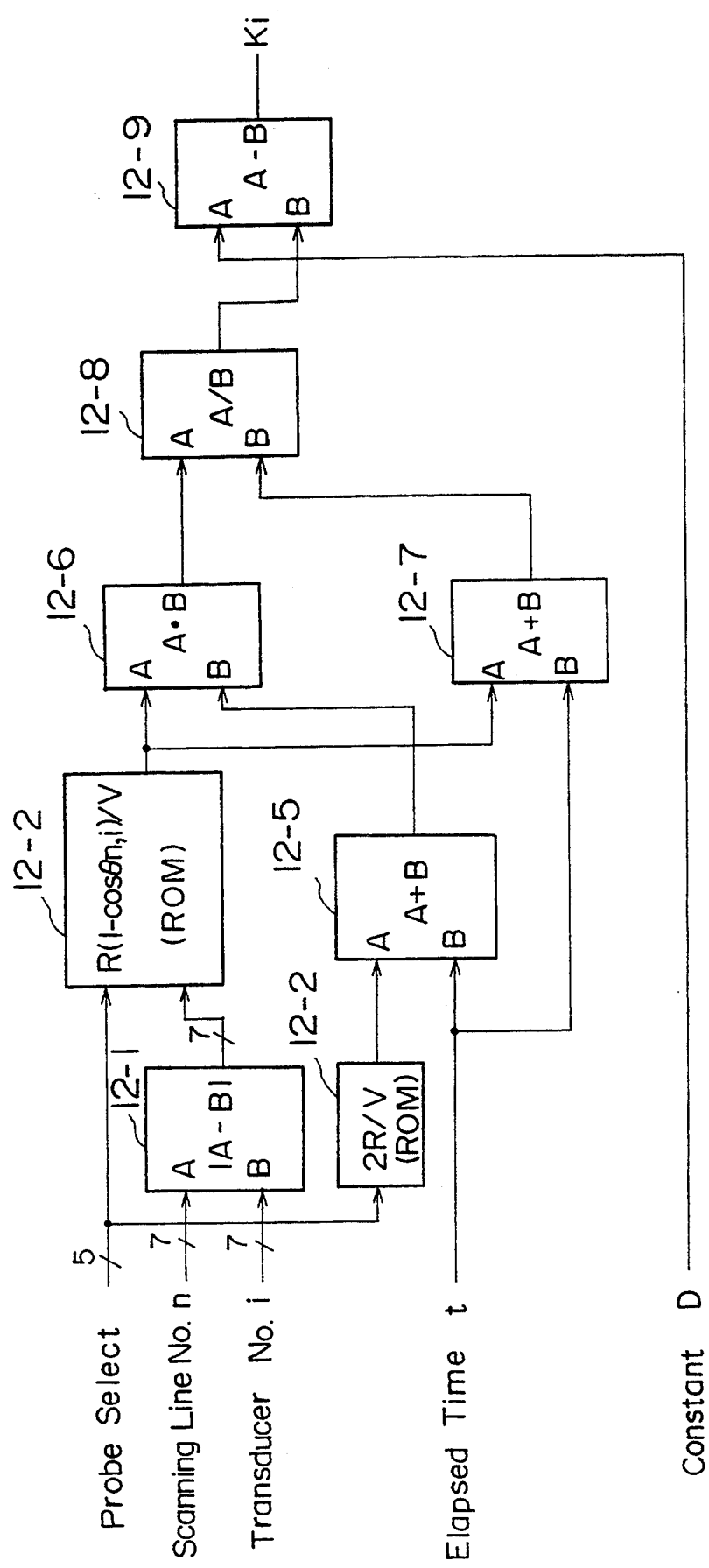
FIG. 8 is a block diagram showing reception delay amount calculating means in convex sector scanning.

In the reception delay amount calculation means for linear scanning shown in FIG. 8, a probe select signal which indicates that a linear scanning probe consisting of an array of transducers for linear scanning is attached to the transducers as shown, scanning line No.n, transducer No.i, lapse of time t and constant D are entered.

The scanning line No.n and the transducer No.i are entered into a calculator 12-1. This calculator 12-1 calculates the absolute value of a difference of signals entered through two input terminals A and B and, specifically, the absolute value |n−i| of a difference between the scanning line No.n and the transducer No.i is calculated by this calculator 12-1. This calculated absolute value |n−i| is entered as address data into the ROM 12-2. The probe select signal is also entered in the ROM 12-2 and $Hi^2/V^2$ corresponding to the calculated value |n−i| is outputted from the ROM 12-2 according to the probe select signal. This output value $Hi^2/V^2$ and the lapse of time t are entered into a divider 12-3 and $Hn,i^2/(V^2 \cdot t)$ is obtained from the divider 12-3. Output value $Hn,i^2/(V^2 \cdot t)$ of this divider 12-3 and constant D are entered into a subtractor 12-4. A delay time given below is obtained from this subtractor 12-4. Expression (10) is the same as the expression (8).

$$Kn,i = D - Hn,i^2/(V^2 \cdot t) \quad (10)$$

Figure 7:
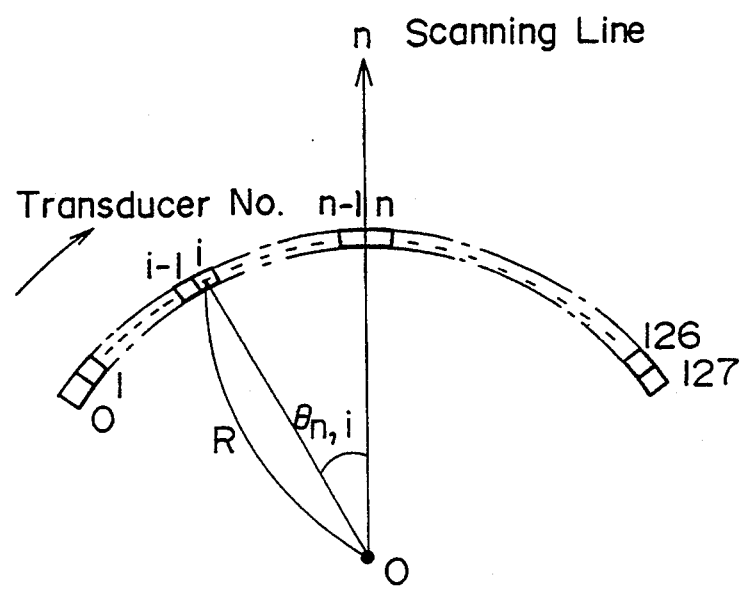
FIG. 7 is a diagram showing a relationship between scanning lines and transducers in convex sector scanning.

FIG. 7 is a diagram showing a relationship between the scanning lines and the transducers in convex sector scanning and FIG. 8 is a configuration block diagram of the reception delay amount calculation means in convex sector scanning.

Transducers are arranged in the shape of circular arc and an angle $\theta n,i$ formed by a line in the scanning line direction passing through the center of this circular arc and a line in the direction of transducer No.i is as given below, where the radius of the circular arc is R.

$$\theta n,i = |(n-i+\tfrac{1}{2}) \cdot P|/R \quad (11)$$

A delay time Kn,i of each transducer is obtained as given below by substituting expression (10) for expression (5).

$$Kn,i = D - \{(R/V)(1-\cos \theta n,i)(t+2R/V)\}/\{(R/V)(1-\cos \theta n,i)+t\} \quad (12)$$

When expression (11) is transformed, the following expression is obtained and angle $\theta n,i$ is primarily determined according to |n−i|.

Scanning line No.n and transducer No.i are entered into the calculator 12-1 to obtain |n−i| and |n−i| is entered into the ROM 12-2. The probe select signal which indicates that the probe for convex sector scanning is selected is entered into the ROM 12-2. 2R/V is read out from the ROM 12-2 according to the probe select signal received and entered into an adder 12-5, then |n−i| is entered and R(1−cos $\theta n,i$)/V is read out. 2R/V read out from the ROM 12-2 and lapse of time t are entered into the adder 12-5 and an added value t+2R/V is obtained. This added value t+2R/V is entered with R(1−cos $\theta n,i$)/V read out from the ROM 12-2 into a multiplier and R(1−cos $\theta n,i$)(t+2R/V)/V is obtained.

Value R(1−cos $\theta n,i$)/V and lapse of time t are entered into the adder 12-7 and value R (1−cos $\theta n,i$)/V+t is obtained. Values R(1−cos $\theta n,i$)(t+2R/V)/V and R(1−cos $\theta n,i$)/V+t obtained by the multiplier 12-6 and the adder 12-7 are entered into the divider 12-8 and a value given below is calculated.

{R(1−cos $\theta n,i$)(t+2R/V)/V}/{R(1−cos $\theta n,i$)/V+t}

In addition, the result of calculation of this divider 12-8 is entered with constant D into the subtractor 12-9 and a delay time as given below is obtained from this subtractor 12-9. This expression (14) is the same as expression (12).

$$Kn,i = D - \{R(1-\cos \theta n,i)(t+2R/V)/V\}/\{R(1-\cos \theta n,i)/V+t\} \quad (14)$$

Figure 9:
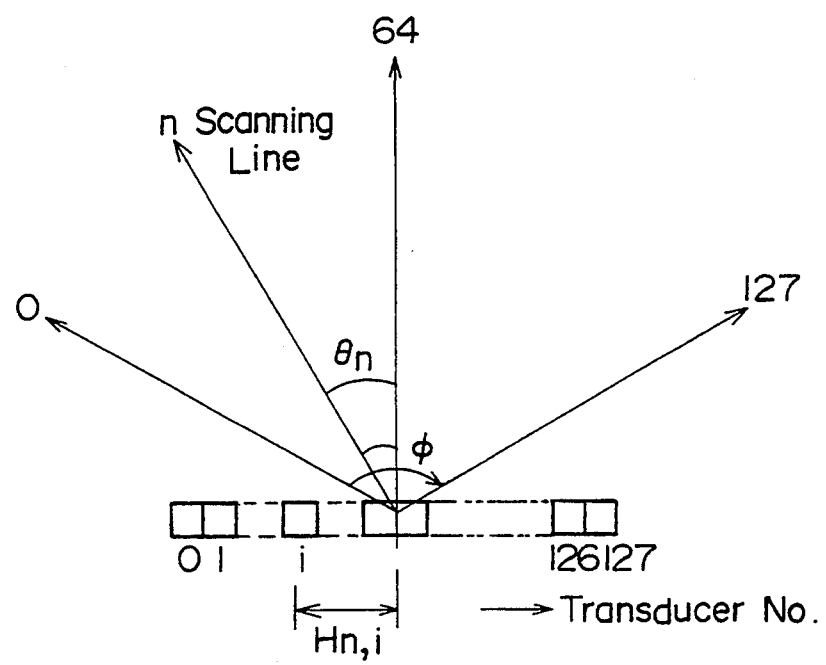
FIG. 9 is a diagram showing a relationship between scanning lines and transducers in phased array sector scanning.
Figure 10:
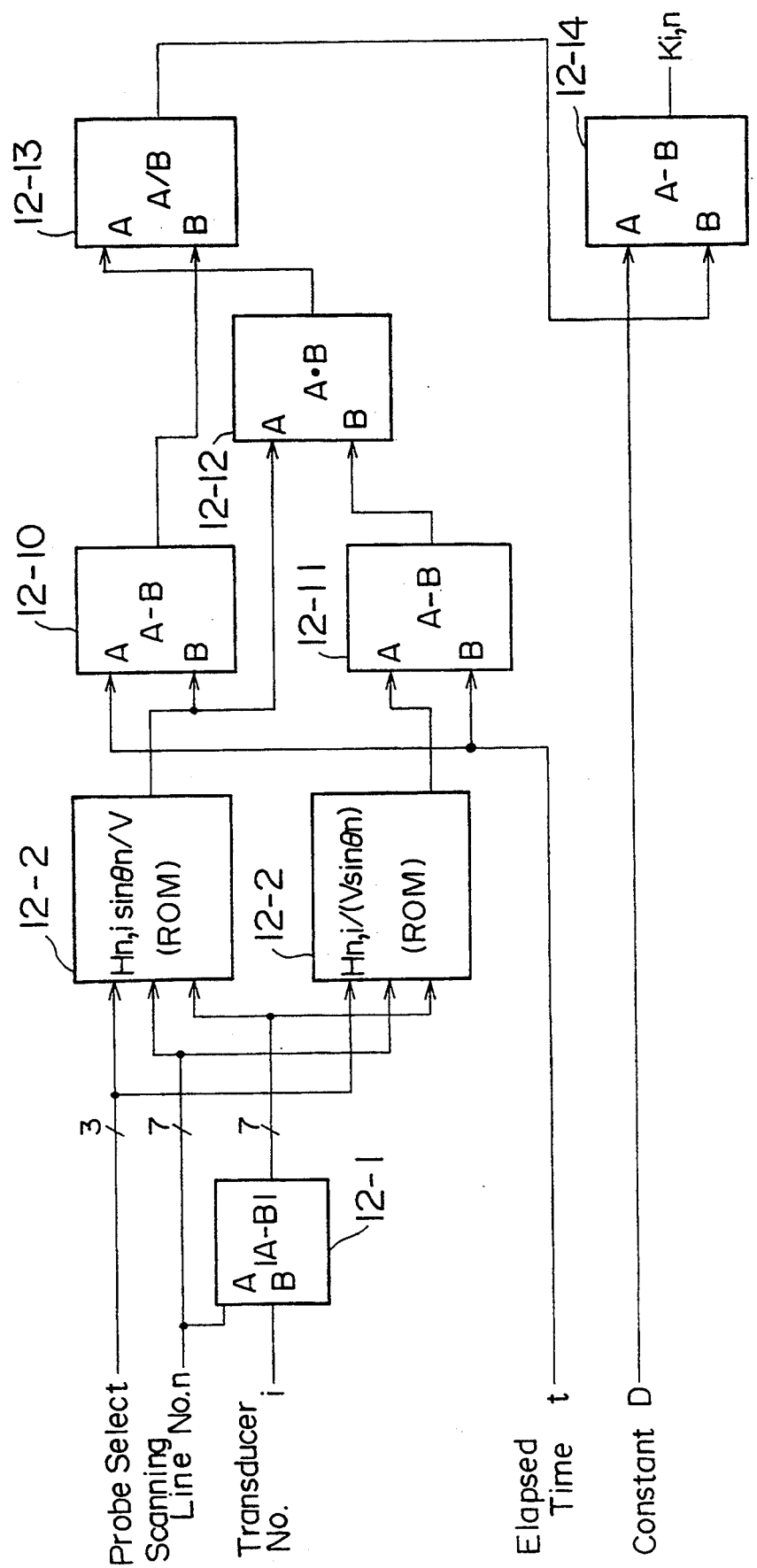
FIG. 10 is a block diagram showing reception delay amount calculating means in phased array sector scanning.

FIG. 9 is a diagram showing a relationship between the scanning lines and the transducers in phased array sector scanning and FIG. 10 is a configuration block diagram of the reception delay amount calculation means in phased array sector scanning.

For phased array sector scanning, a number of scanning lines extend radially. In this case, it is assumed that 128 scanning lines in total with scanning line Nos. 0~127 are provided and the scanning line No. 0 and the scanning line No. 127 are symmetrically extended, thereby other scanning lines are arranged at equal angles between the scanning lines No. 0 and No. 127. Accordingly, the scanning line of scanning line No. 64 extends in a vertical direction in the diagram, that is, a direction normal to the array direction of transducers.

If an angle formed by the scanning line of scanning line No. 0 and the scanning line of No. 127 is $\phi$, an angle formed by the scanning line (perpendicular) of scanning line No. 64 and the scanning line of No.n is $\theta n$ and a distance Hn,i between the center of an array of transducers (a point where the scanning line of scanning line No. 64 and a transducer intersect) and the transducer of transducer No.i is Hn,i, these values are as given below:

$$\theta n = (n-64)\phi/128 \quad (15)$$

$$Hn,i = |(n-i-\tfrac{1}{2}) \cdot P| \quad (16)$$

As known from expressions (15) and (16), $\phi$ and P are predetermined and therefore angle $\theta n$ is primarily determined by n and distance Hn,i is also primarily determined by |n−i|.

Delay time Kn,i of each transducer on each scanning line is obtained as given below by substituting expressions (15) and (16) for expression (6):

$$Kn,i = D - \{(Hn,i \sin \theta n/V)(-t+Hn,i/(V \sin \theta n))\}/\{t-Hn,i \sin \theta n/V\} \quad (17)$$

The scanning line No.n and the transducer No.i are entered into the calculator 12-1 and an absolute value of a difference of these values is obtained. The probe select signal, scanning line No.n and value |n−i| obtained from the calculator 12-1 are entered into the ROM 12-2 and Hn, i sin $\theta n$/V and Hn,i/(V sin $\theta n$) are read out. Value Hn,i sin $\theta n$/V read out from the ROM 12-2 is entered with lapse of time t into the subtractor 12-10 and value t−Hn,i sin $\theta n$/V is obtained from this subtractor 12-10. Value Hn,i/(V sin $\theta n$) read out from the ROM 12-2 is entered with lapse of time t into the adder 12-11 and value −t+Hn,i/(V sin $\theta n$) is obtained from this adder 12-11. Value −t+Hn,i/(V sin $\theta n$) obtained from the adder 12-11 and value Hn,i sin $\theta n/V$ read out from the ROM 12-2 are entered into the multiplier 12-12 and value (Hn,i sin $\theta n/V$) {$-t+$Hn,i/(V sin $\theta n$)} is obtained from the multiplier 12-12. Value (Hn,i sin $\theta n/V$) {$-t+$Hn,i/(V sin $\theta n$)} obtained from this multiplier is entered into a divider 12-13 together with value $t-$Hn,i sin $\theta n/V$ obtained from the subtractor 12-10 and value {(Hn,i sin $\theta n/V$) ($-t+$Hn,i/(V sin $\theta n$))}/{$t-$Hn,i sin $\theta n/V$} is obtained from this divider 12-13. The value obtained and constant D are entered into the subtractor 12-14 and each delay time as given below is obtained from the subtractor 12-14. This expression (18) is the same as expression (17).

$$Kn,i = D - \{(Hn,i \sin \theta n/V)(-t+Hn,i/(V \sin \theta n))\}/\{t-Hn,i \sin \theta n/V\} \quad (18)$$

In the foregoing paragraphs, reception delay amount calculation means 12 (refer to FIG. 4) is described as a hardware example; however calculation of the delay amount may be carried out according to a software by a computer which is built in the apparatus.

Storage means for storing the reception delay amount calculated in advance as in the conventional example may be provided instead of reception delay amount calculation means 12 to read out the values stored to control reception delay means 10. Even in this case, the demand for a larger scanning aperture can be satisfied.

Figure 11:
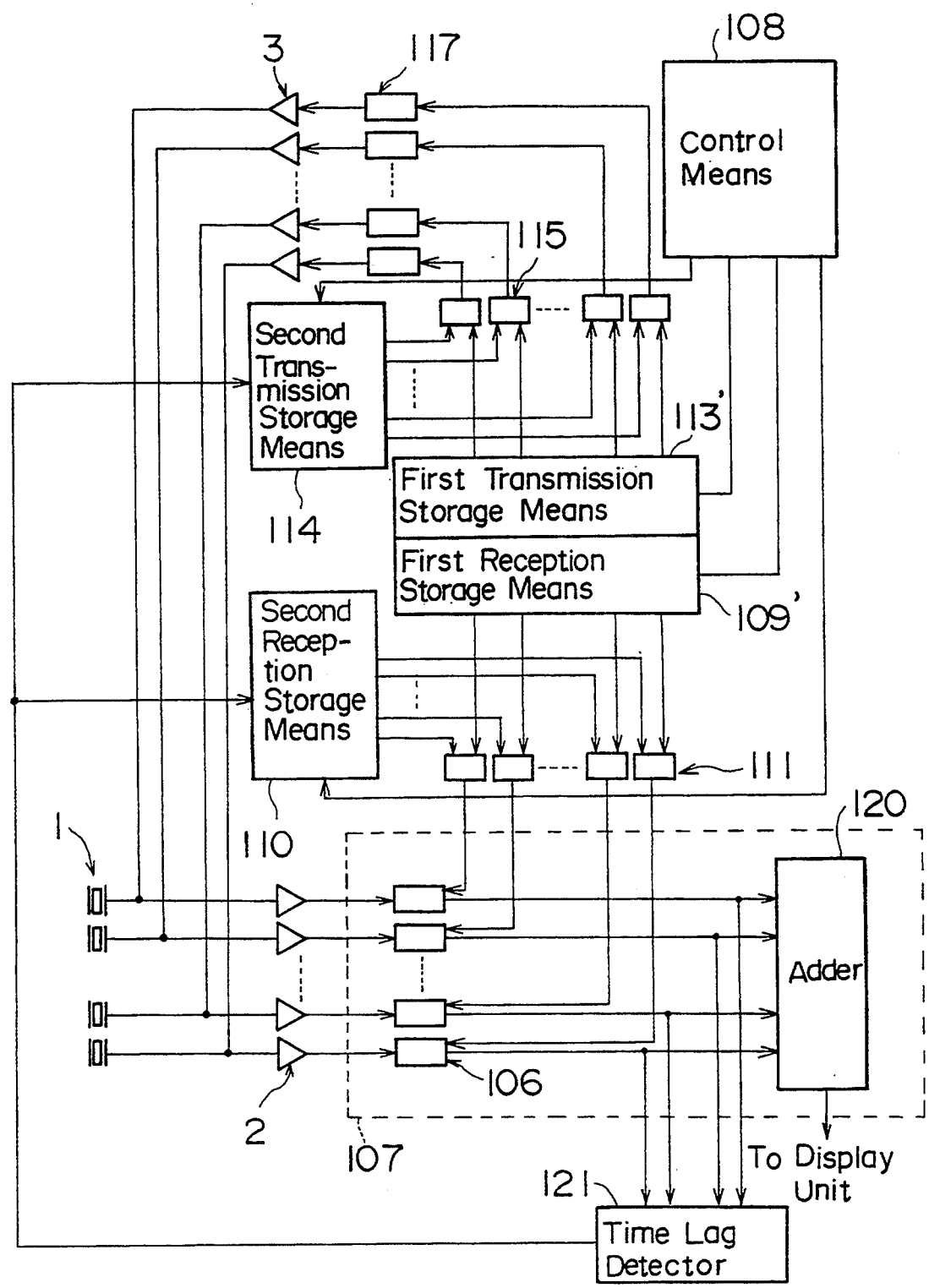
FIG. 11 is a configuration block diagram showing a configuration of the ultrasonic diagnostic apparatus in accordance with an embodiment of the present invention.

FIG. 11 is a block diagram of the basic configuration of an ultrasonic diagnostic apparatus in accordance with another embodiment of the present invention. The same components as the corresponding conventional example (refer to FIG. 20) are given the same numbers and only different points are described below.

This ultrasonic diagnostic apparatus is provided with second transmission storage means 114 and second reception storage means 110 for storing compensation data in addition to first transmission storage means 113' and first reception storage means 109' for respectively storing transmission delay time data and reception delay time data (control data as defined in the present invention) corresponding to conventional transmission storage means 113 and reception storage means 109. In actual delay time control, at the transmission side, the control data and the compensation data read out respectively from first transmission storage means 113' and second transmission storage means 114 are added by a group of adders 115 and sent to the delay circuit 117 and, at the reception side, the control data and the compensation data read out respectively from first reception storage means 109' and second reception storage means 110 are added by a group of adders 111 and sent to delaying/adding means 107.

Figure 20:
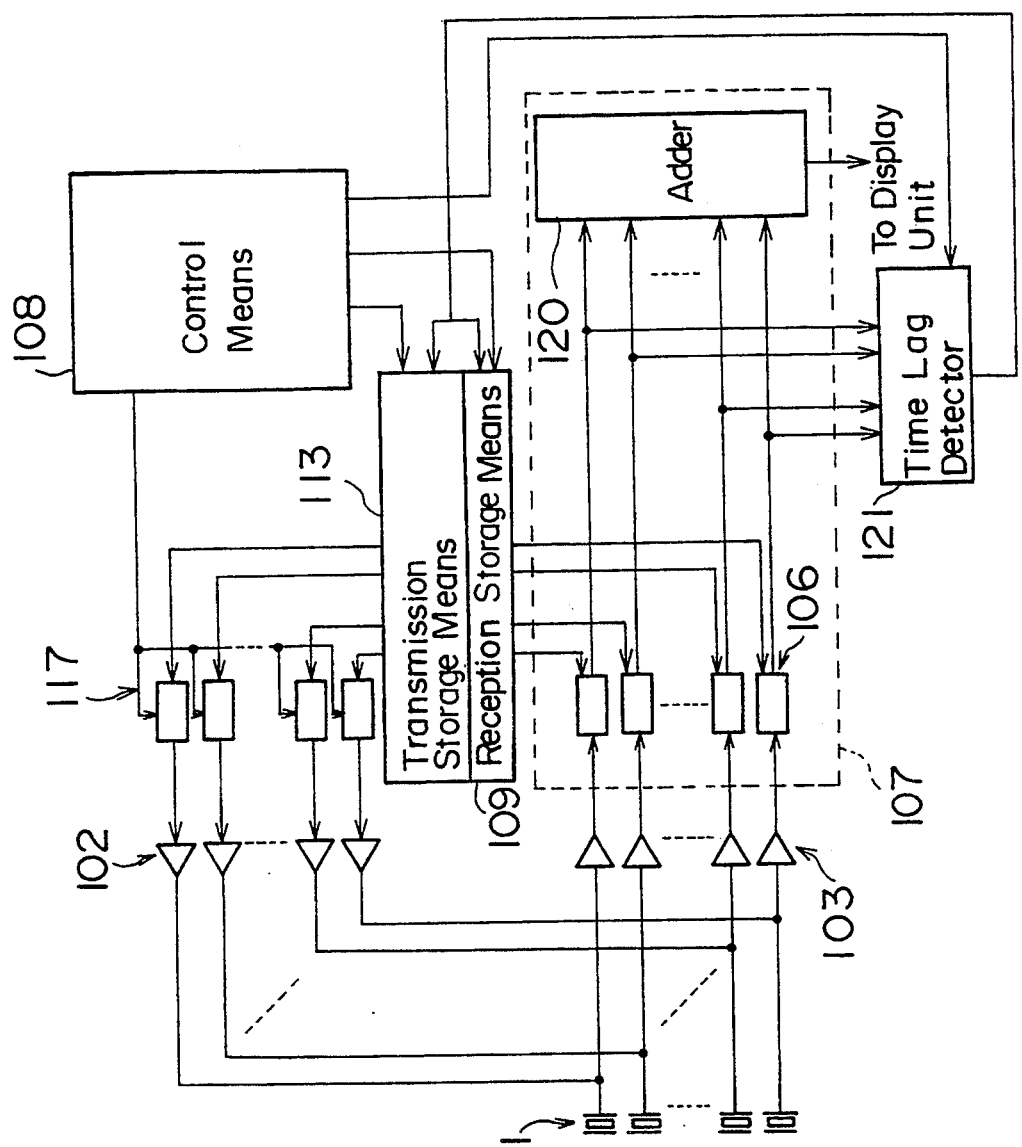
FIG. 20 is a configuration block diagram of an ultrasonic diagnostic apparatus provided with a configuration for compensating wavefront deviation.

This ultrasonic diagnostic apparatus shown in FIG. 11 is provided with a time lag detector 121 similar to that of the conventional example as shown in FIG. 20 and compensation data for compensating a time lag detected by this time lag detector is stored in second transmission storage means 114 and second reception storage means 110.

Figure 12:
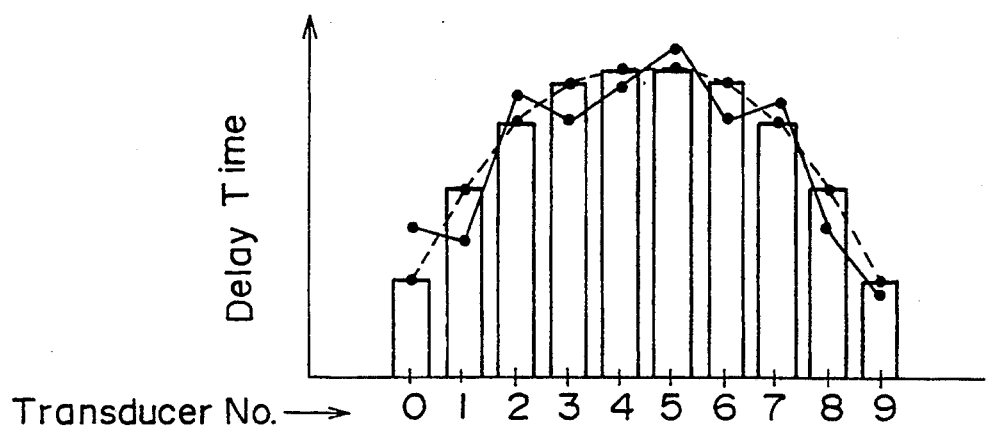
FIG. 12 is a diagram showing an example of a delay pattern stored in first storage means and a delay pattern to be actually given.
Figure 13:
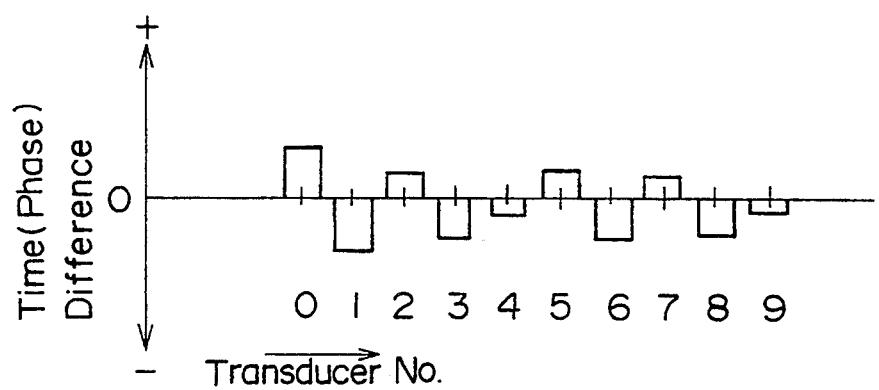
FIG. 13 is a diagram showing an example of compensation delay data stored in second storage means.

FIG. 12 is a diagram showing control data (delay pattern) stored in first transmission storage means 113' and first reception storage means 109' and FIG. 13 is a diagram showing an example of compensation data (compensation delay pattern) stored in second transmission storage means 114 and second reception storage means 110.

A delay pattern which occurs due to a time lag does not largely deviate from a delay pattern obtained based on an assumption that the velocity of sound is uniform in a subject and therefore a delay pattern obtained from calculation is stored in first transmission storage means 113' and first reception storage means 109' and a difference between a theoretical delay pattern and a delay pattern to be actually given as shown in FIG. 13 is stored in second transmission storage means 114 and second reception storage means 110.

In this embodiment provided with a configuration as described above, first transmission storage means 113' and first reception storage means 109', which respectively require an extremely large storage capacity, store control data calculated under assumption that the velocity of sound is uniform in a subject and the control data need not be rewritten. Compensation data to be required along with unevenness of the velocity of sound is stored in second transmission storage means 114 and second reception storage means 110 which may have a smaller storage capacity and therefore the data reentry time can be reduced and tomographic images with a high frame rate can be displayed.

Though the embodiment shown in FIG. 11 is adapted to compensate a time lag detected by the time lag detector 121 at both the transmission side and the reception side, it can be adapted to implement compensation of the time lag only at one of the transmission side and the reception side. Therefore, one of the transmission side and the reception side is given a similar configuration to the conventional example and the other side may be provided with first storage means, second storage means and adders.

Figure 14:
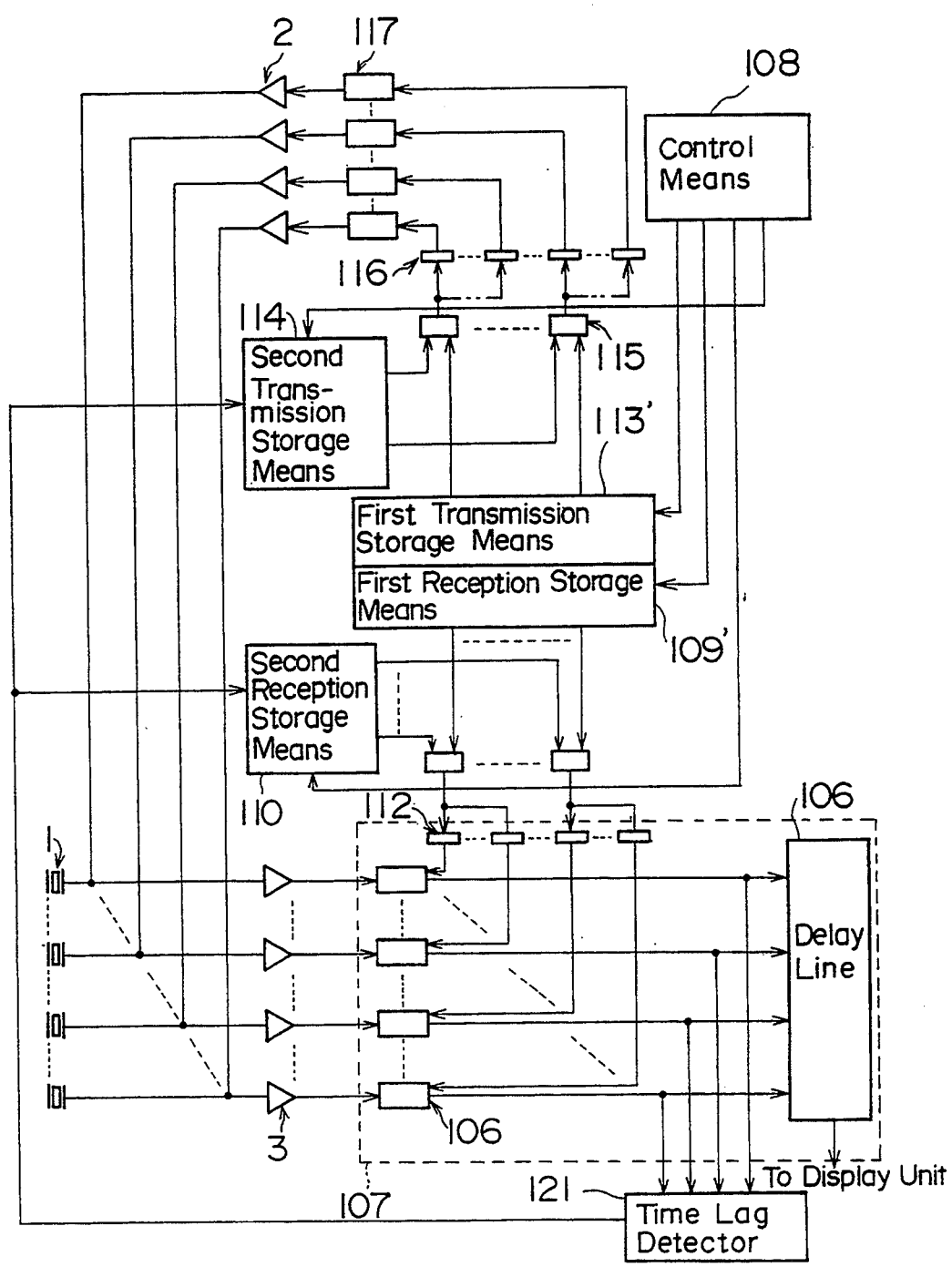
FIG. 14 is a configuration block diagram showing a variation example of the embodiment shown in FIG. 11.

FIG. 14 is a configuration block diagram showing a variation example of the embodiment shown in FIG. 11. Those points different from the embodiment shown in FIG. 11. Those points different from the embodiment shown in FIG. 11 are described below.

In the embodiment shown in FIG. 14, groups of adders 111 and 115 respectively comprise a less number of adders than those adders which form respectively groups of adders 111 and 115 shown in FIG. 11. Instead, a plurality of latches which respectively form groups of latches 112 and 116 are connected to the adders which form groups of adders 111 and 115.

This configuration is the same with the transmission side and the reception side and accordingly the following describes only the configuration of the transmission side.

Control data read out from first transmission storage means 113' and compensation data read out from second transmission storage means 114 are added to one another by a group of adders 115. As described above, a plurality of latches are connected to adders which form this group of adders 115 and these latches are connected one by one to the transmission delay circuit 117. For setting focuses, the control circuit 108 reads out in sequence respectively control data and compensation data from first transmission storage means 113' second transmission storage means 114 as many times as the number of latches connected to one adder of the group of adders 111 stores the data in sequence in the latches. In this case, a work necessary for setting the focuses increases as compared with the embodiment shown in FIG. 11 but the numbers of output terminals of first transmission storage means 113' and second transmission storage means 114 and the number of adders can be reduced. Extension of time necessary for setting the focuses can be compensated by using high speed memories as first transmission storage means 113' and second transmission storage means 114.

Figure 15:
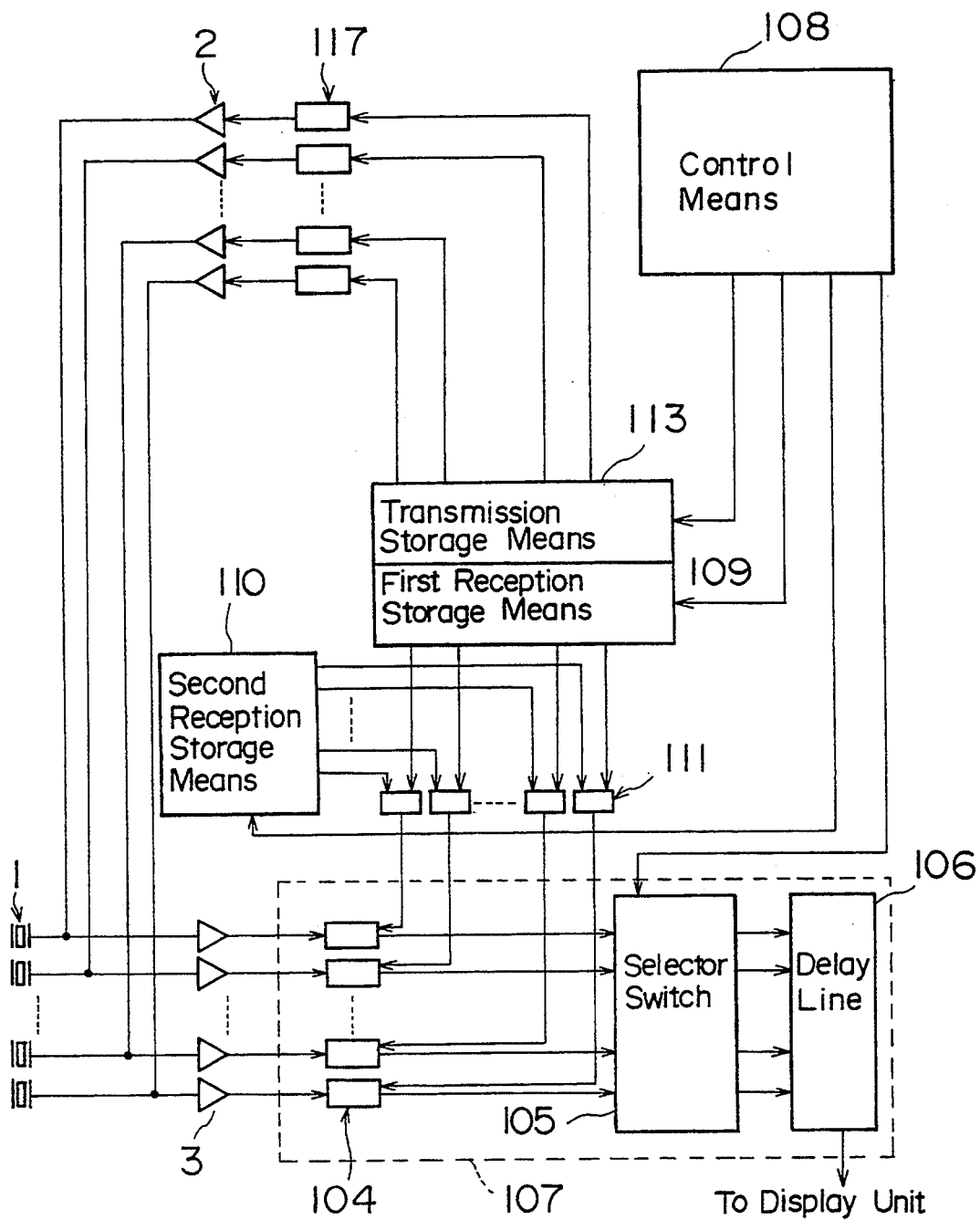
FIG. 15 is a configuration block diagram of an ultrasonic diagnostic apparatus in accordance with another embodiment of the present invention.

FIG. 15 is a block diagram of basic configuration of an ultrasonic diagnostic apparatus in accordance with a further another embodiment of the present invention.

Figure 21:
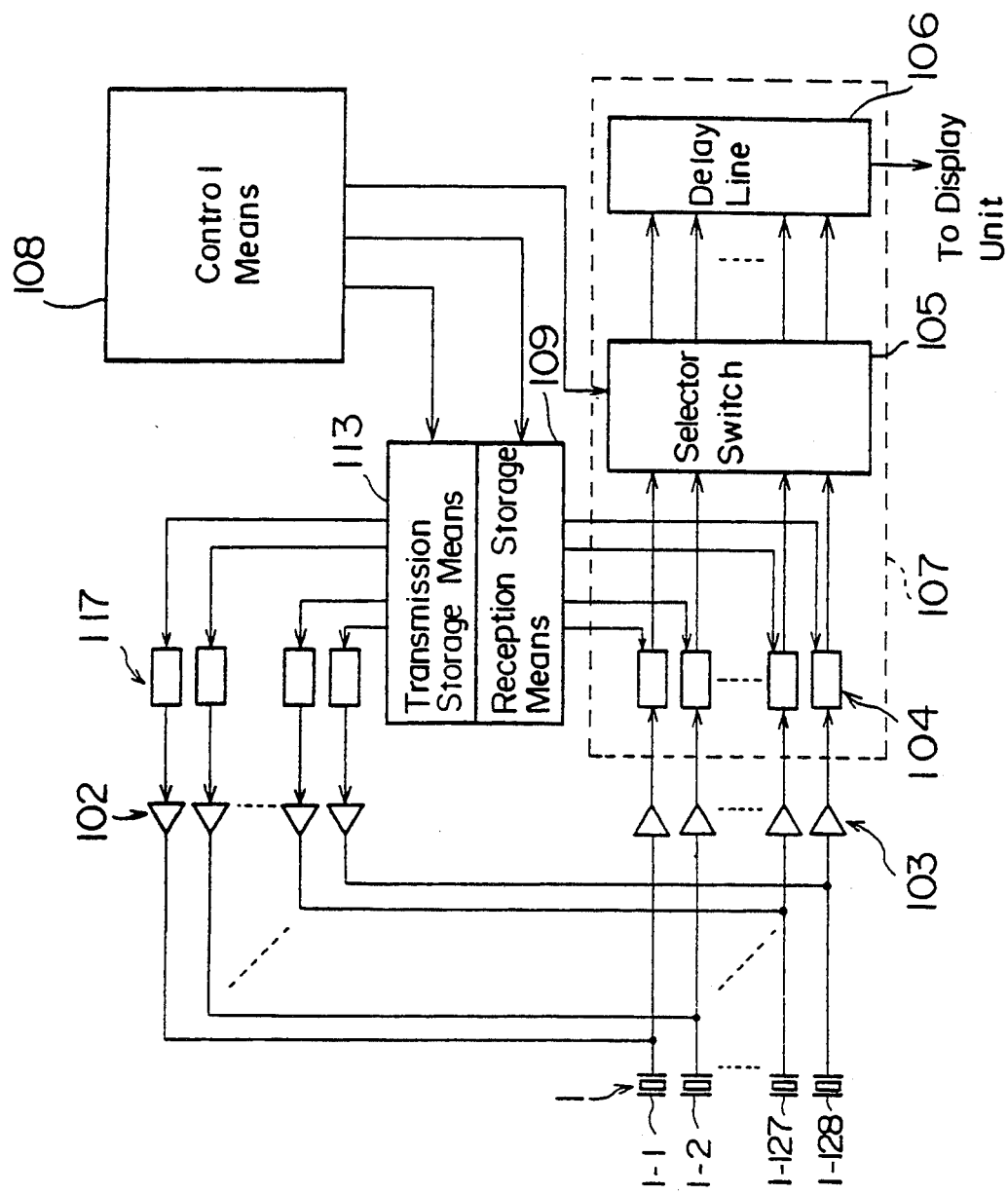
FIG. 21 is a configuration block diagram of another different conventional ultrasonic diagnostic apparatus.
Figure 22:
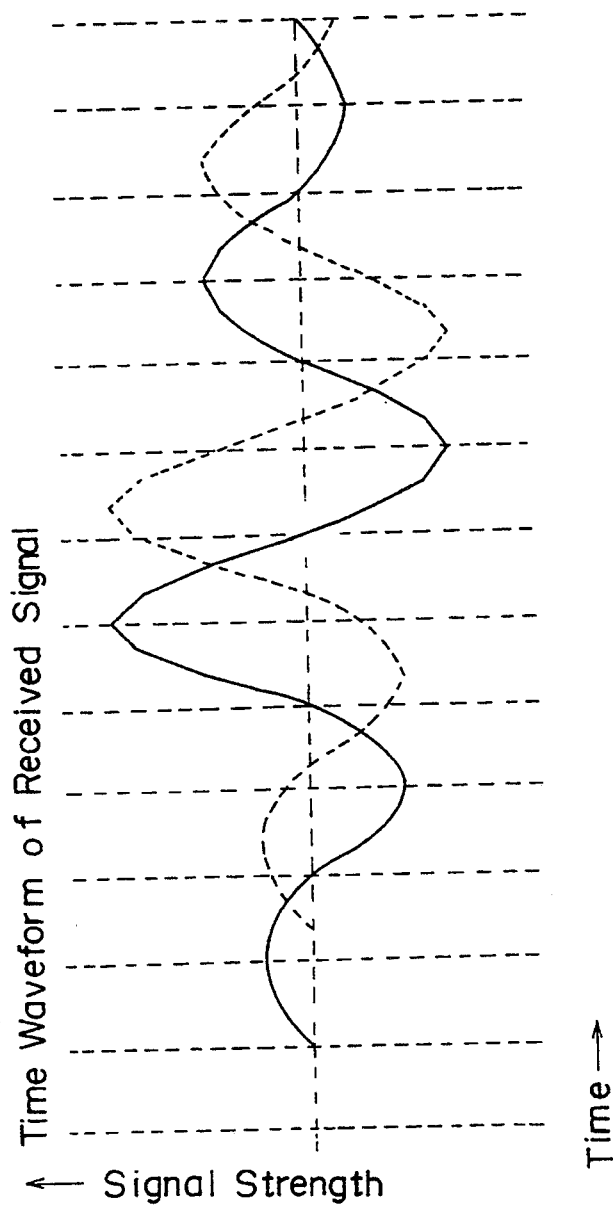
FIG. 22 is a diagram showing an example time waveform of received signals.
Figure 23:
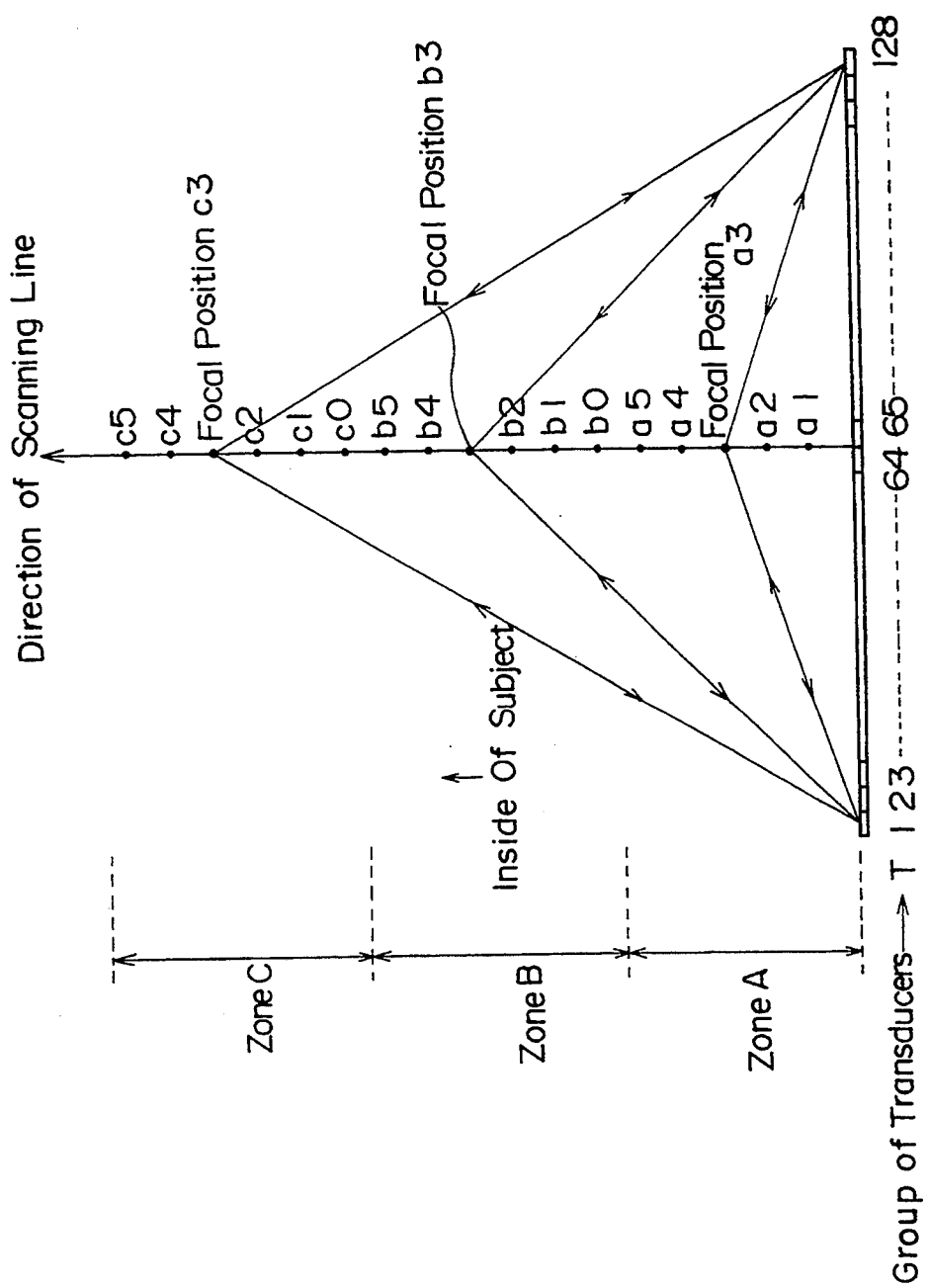
FIG. 23 is an illustrative diagram of focal positions which represent a relationship between the array of ultrasonic transducers and focal positions in the subject.

The same components as in the above described corresponding conventional example (refer to FIG. 21) are given the same numbers and only different points are described below.

This embodiment provides a characteristic configuration of the present invention at the reception side. First reception storage means 109' stores phase control data to be entered into a group of phase shifters 104 in the event it is assumed that an ideal delay lines 106 free from a difference of delay amount is provided and second reception storage means 110 stores compensation data for the difference of delay amount resulting from variations in workmanship of respective delay lines 6. Actual phase compensating operation by a group of phase shifters 104 is carried out in accordance with phase control data read out from first reception storage means 109' and compensation data read out second reception storage means 110 which are added to one another. Accordingly variations of individual delay lines 106 are compensated and correct addition of delay amounts may be carried out. In this case, only second reception storage means 110 which has a small storage capacity requires rewriting due to variations of individual delay lines 106 and therefore man-hours for manufacturing the apparatus are reduced as compared with the conventional apparatus.

Figure 18:
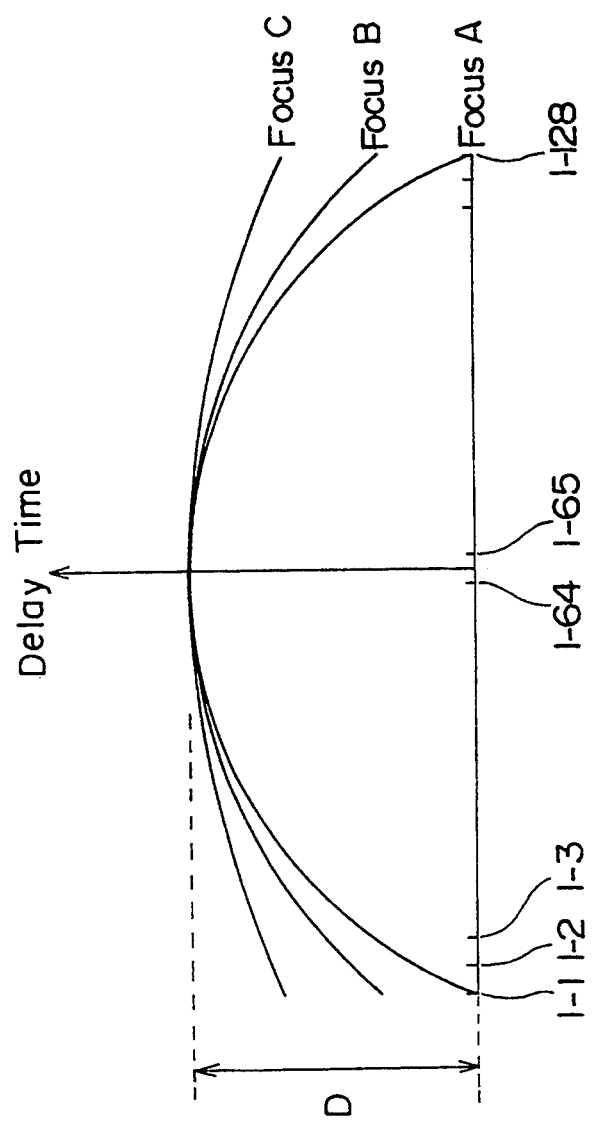
FIG. 18 is a graphic diagram showing a relationship between transducers and the delay time.
Figure 19:
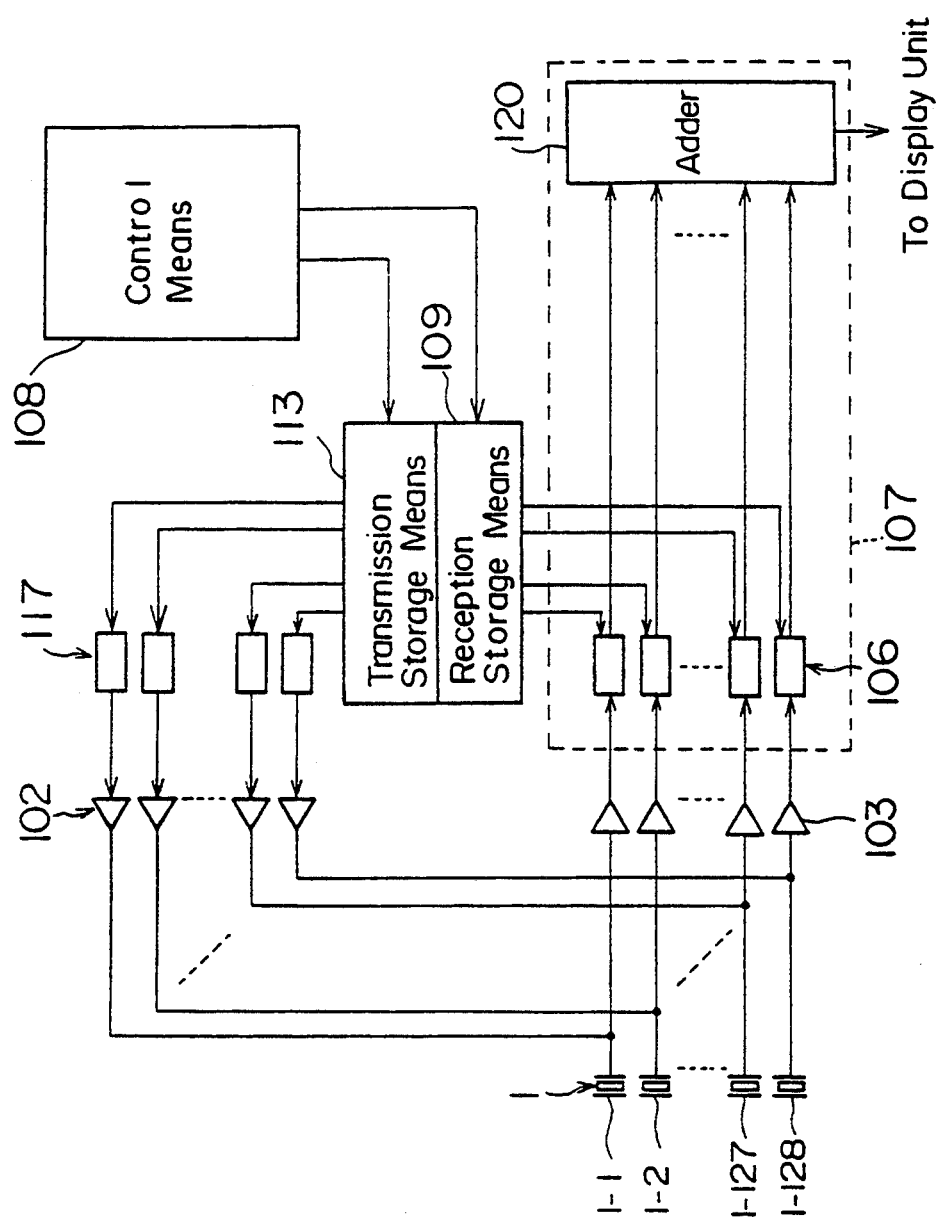
FIG. 19 is a block diagram showing another configuration example of the conventional ultrasonic transducers.

In the embodiment shown in FIG. 18, a group of phase shifters 104 are used as delay means. In this case, Data of phase values can be expressed, as an example, with 4 bits and coded as shown in Table 1. Thus a quantized difference of phase values is controlled to be within $\pm 1/16 + 2$ cycles ($=\pm 11.25°$) and addition is not adversely affected. If negative phase values are expressed as binary-coded complements, they do not deviate from the values given in Table 1 and therefore the carry in addition can be ignored and the volume of delay time control data can be limited to the required least.

TABLE 1

| Control data MSB LSB | Phase (cycle) |
|---|---|
| 0 0 0 0 | 0 |
| 0 0 0 1 | 1/16 |
| 0 0 1 0 | 2/16 |
| 0 0 1 1 | 3/16 |
| 0 1 0 0 | 4/16 |
| 0 1 0 1 | 5/16 |
| 0 1 1 0 | 6/16 |
| 0 1 1 1 | 7/16 |
| 1 0 0 0 | 8/16 (−8/16) |
| 1 0 0 1 | 9/16 (−7/16) |
| 1 0 1 0 | 10/16 (−6/16) |
| 1 0 1 1 | 11/16 (−5/16) |
| 1 1 0 0 | 12/16 (−4/16) |
| 1 1 0 1 | 13/16 (−3/16) |
| 1 1 1 0 | 14/16 (−2/16) |
| 1 1 1 1 | 15/16 (−1/16) |

The embodiment shown in FIG. 15 is described under the assumption that the compensation data for compensating the difference of delay amounts through the delay line is stored in second reception storage means 110. In this case, first reception storage means 109' may store only delay data for forming the focuses at focal positions a3, b3 and c3 shown in FIG. 106 (data for selecting the tap positions of delay line 106 in response to changeover of selector switches 105) and second reception storage means 110 may store phase control data for forming the focuses at focal positions a1, a2, ..., c5, including an error component due to the delay line 106. Also in this case, second reception storage means 110 may have a relatively small capacity and a load in manufacturing due to qualitative variations of the delay line 6 may be relieved.

We claim:

1. An ultrasonic diagnostic apparatus comprising:
   an ultrasonic probe having a number of ultrasonic transducers arrayed in a specified direction for transmitting ultrasonic waves into a subject and receiving ultrasonic waves reflected inside said subject to obtain respective received signals,
   delaying/adding means for delaying said respective received signals and adding delayed signals to make an added signal which indicates a focus which is shifted in sequence in said subject,
   delay time control means for controlling respective delay times of said respective received signals in said delaying/adding means, and
   display means for displaying a tomographic image of an inner part of said subject in accordance with said added signal which is outputted from said delaying/adding means,
   wherein said delay time control means controls said delaying/adding means so that respective delay times for respective received signals corresponding to said respective ultrasonic transducers may be adaptively changed at respective change times to sequentially shift the focus, said change times being changed on the basis of respective array positions of a number of said ultrasonic transducers and a lapse of time from time when ultrasonic waves are transmitted from said ultrasonic transducers.

2. An ultrasonic diagnostic apparatus in accordance with claim 1, which is a linear scanning type ultrasonic diagnostic apparatus, provided with a linear scanning type ultrasonic probe having a number of said ultrasonic transducers in linear arrangement as said ultrasonic probe for obtaining rectangular tomographic images of an inner part of said subject through 2-dimensional scanning by shifting in sequence scanning lines formed to be normal to the array direction of a number of said ultrasonic transducers in said array direction of said transducers, wherein said delay time control means controls said delaying/adding means so that said received signals are delayed in accordance with $$K = D - H^2/(V^2 t)$$

where, H is a distance between a scanning line and each ultrasonic transducer, t is a lapse of time from the timing of transmission of ultrasonic waves, V is a velocity of sound in a subject, K is a delay time, and D is a specified constant to avoid an negative value of delay time K.

3. An ultrasonic diagnostic apparatus in accordance with claim 2, wherein said delay time control means controls said delaying/adding means in accordance with said delay time K which is integer-valued by quantizing said delay time in terms of unit time.

4. An ultrasonic diagnostic apparatus in accordance with claim 2, wherein said delay time control means controls said delaying/adding means in accordance with said delay time K obtained by using values D, H/V and t which are integer-valued by quantizing these values in terms of unit time.

5. An ultrasonic diagnostic apparatus in accordance with claim 1, which is a convex sector scanning type ultrasonic diagnostic apparatus, provided with a convex scanning type ultrasonic probe having of a number of said ultrasonic transducers in circular arc arrangement as said ultrasonic probe for obtaining sector-shaped tomographic images of an inner part of said subject through 2-dimensional scanning by shifting in sequence scanning lines formed to be normal to the array direction of a number of said ultrasonic transducers in said array direction of said transducers, wherein said delay time control means controls said delaying/adding means so that said received signals are delayed in accordance with $$K=D-\{R/V(1-\cos\theta)(t+2R/V)/\{R/V(1-\cos\theta)+t\}$$

where, R is a radius of circular arc along which a number of said ultrasonic transducers, $\theta$ is an angle formed by a scanning line and a line connecting the center of said circular arc and respective ultrasonic transducers, t is a lapse of time from the timing of transmission of ultrasonic waves, V is a velocity of sound in a subject, K is a delay time, and D is a specified constant to avoid an negative value of delay time K.

6. An ultrasonic diagnostic apparatus in accordance with claim 5, wherein said delay time control means controls said delaying/adding means in accordance with said delay time K which is integer-valued by quantizing said delay time in terms of unit time.

7. An ultrasonic diagnostic apparatus in accordance with claim 5, wherein said delay time control means controls said delaying/adding means in accordance with said delay time K obtained by using values D, R/V, R/V(1−cos $\theta$) and t which are integer-valued by quantizing these values in terms of unit time.

8. An ultrasonic diagnostic apparatus in accordance with claim 1, which is a phased array sector scanning type ultrasonic diagnostic apparatus, provided with a linear scanning type ultrasonic probe having a number of said ultrasonic transducers in linear arrangement as said ultrasonic probe for obtaining a sector-shaped tomographic image of an inner part of said subject through 2-dimensional scanning by shifting in sequence scanning lines, which are formed to pass through a specified point on the array of a number of said ultrasonic transducers and extend in a plane including the array direction of a number of said ultrasonic transducers and in a direction where a specified angle is formed with a normal line to said array direction of ultrasonic transducers, in a direction where the said specified angle is changed in sequence, wherein said delay time control means controls said delaying/adding means so that said received signals are delayed in accordance with $$K=D-\{H\sin\theta/V(-t+H/(V\sin\theta))/\{t-H\sin\theta/V\}$$

where, H is a distance between said specified point and respective ultrasonic transducers, $\theta$ is said specified angle, t is a lapse of time from the timing of transmission of ultrasonic waves, V is a velocity of sound in a subject, K is a delay time, and D is a specified constant to avoid an negative value of delay time K.

9. An ultrasonic diagnostic apparatus in accordance with claim 8, wherein said delay time control means controls said delaying/adding means in accordance with said delay time K which is integer-valued by quantizing said delay time in terms of unit time.

10. An ultrasonic diagnostic apparatus in accordance with claim 8, wherein said delay time control means controls said delaying/adding means in accordance with said delay time K obtained by using values D, H sin $\theta$/V, H/(V sin $\theta$) and t which are integer-valued by quantizing these values in terms of unit time.

11. An ultrasonic diagnostic apparatus provided with a number of ultrasonic transducers which are arrayed in a specified direction to transmit ultrasonic waves into a subject and receive ultrasonic waves reflected in said subject to obtain received signals, a transmission part which transmits driving pulses to respective ultrasonic transducers to drive said ultrasonic transducers so that ultrasonic waves transmitted from said ultrasonic transducers are focused at the specified point, a delaying/adding part which delays said received signals and adds these signals one another to make an added signal, and a display part which displays tomographic images of an inner part of the subject in accordance with said added signal which are outputted from said delaying/adding part and characterized in that said delaying/adding part is provided with first storage means for storing control data which determines a delay time of each of said received signals, second storage means for storing compensation data which compensates said control data and adding means for adding the control data read out from said first storage means and the compensation data read out from said second storage means and controls the delay time of respective received signals in accordance with these added data.

12. An ultrasonic diagnostic apparatus in accordance with claim 11, provided with time lag detection means which detects a time lag among said received signals due to unevenness of a velocity of sound in the subject and characterized in that said first storage means stores control data which determines a delay time of said respective received signals under assumption that the velocity of sound is uniform in the subject and second storage means stores compensation data which compensates a time lag among said received signals which is detected by said time lag detection means.

13. An ultrasonic diagnostic apparatus in accordance with claim 11, wherein said delaying/adding part is provided with phase shifting means for shifting phases of said received signals and a delay line which has a number of taps, said first storage means stores control data which determine a delay time of said respective received signals where a difference of delay amounts of said delay line is excluded from consideration, and said second storage means stores compensation data which compensates the difference of delay amounts of said delay line.

14. An ultrasonic diagnostic apparatus in accordance with claim 13, provided with time lag detection means for detecting a time lag among said received signals due to unevenness of the velocity of sound in the subject in accordance with said received signals and third storage means which stores the second compensation data for compensating a time lag among said received signals detected by said time lag detection means, wherein said delaying/adding means adds said control data, said compensation data and said second compensation data.

15. An ultrasonic diagnostic apparatus provided with a number of ultrasonic transducers which are arrayed in a specified direction to transmit ultrasonic waves into a subject and receive ultrasonic waves reflected in said subject to obtain received signals, a transmission part which transmits driving pulses to respective ultrasonic transducers to drive said ultrasonic transducers so that ultrasonic waves transmitted from said ultrasonic transducers are focused at the specified point, a delaying/adding part which delays said received signals and adds these signals one another to make an added signal, and a display part which displays tomographic images of an inner part of the subject in accordance with received signals which are outputted from said delaying/adding part, wherein said apparatus is characterized in that said transmission part provided with first storage means for storing control data which determines a transmission timing of said respective driving pulses, second storage means for storing compensation data which compensates said control data, and adding means for adding said control data read out from said first storage means and said compensation data read out from said second storage means and controls the transmission timing of ultrasonic waves from said ultrasonic transducers in accordance with these added data.

\* \* \* \* \*

UNITED STATES PATENT AND TRADEMARK OFFICE
CERTIFICATE OF CORRECTION

PATENT NO. : 5,353,797
DATED : October 11, 1994
INVENTOR(S) : Tetsuya MATSUSHIMA et al.

It is certified that error appears in the above-indentified patent and that said Letters Patent is hereby corrected as shown below:

Column 7, line 24, after "form" insert --appropriately positioned focuses even when a scanning-- and after "expanded" insert --,--.

Column 13, line 50, after "storage" insert --means--.

Column 21, line 37, change "+" to --÷--.

Column 22, line 33, after "times" insert --with respect to other of said transducers--.

Signed and Sealed this

Tenth Day of January, 1995

Attest:

BRUCE LEHMAN

*Attesting Officer*  *Commissioner of Patents and Trademarks*